US010429862B2

(12) United States Patent
Garr et al.

(10) Patent No.: US 10,429,862 B2
(45) Date of Patent: *Oct. 1, 2019

(54) INTERACTIVE NAVIGATION ENVIRONMENT FOR BUILDING PERFORMANCE VISUALIZATION

(71) Applicant: Honeywell International Inc., Morris Plains, NJ (US)

(72) Inventors: Matthew E. Garr, Palo Alto, CA (US); Jiri Rojicek, Prague (CZ); Vladimir Bicik, Prague (CZ); Wendy Foslien, Woodbury, MN (US)

(73) Assignee: Honeywell International Inc., Morris Plains, NJ (US)

( * ) Notice: Subject to any disclaimer, the term of this patent is extended or adjusted under 35 U.S.C. 154(b) by 85 days.

This patent is subject to a terminal disclaimer.

(21) Appl. No.: 15/700,336

(22) Filed: Sep. 11, 2017

(65) Prior Publication Data

US 2018/0074530 A1 Mar. 15, 2018

Related U.S. Application Data

(63) Continuation of application No. 14/594,912, filed on Jan. 12, 2015, now Pat. No. 9,760,100, which is a
(Continued)

(51) Int. Cl.
G05D 23/19 (2006.01)
G06F 16/28 (2019.01)
G06T 11/20 (2006.01)

(52) U.S. Cl.
CPC ....... G05D 23/1917 (2013.01); G06F 16/283 (2019.01); G06T 11/206 (2013.01)

(58) Field of Classification Search
CPC .. G05D 23/1917; G06F 16/283; G06T 11/206
See application file for complete search history.

(56) References Cited

U.S. PATENT DOCUMENTS 4,918,615 A 4/1990 Suzuki et al.
4,939,922 A 7/1990 Smalley et al.
(Continued)

FOREIGN PATENT DOCUMENTS

CA 2538139 3/2005
EP 1669912 6/2006
(Continued)

OTHER PUBLICATIONS

"Energy Manager User Guide," Release 3.2, Honeywell, 180 pages, 2008.
(Continued)

Primary Examiner — Maurice L. McDowell, Jr.
(74) Attorney, Agent, or Firm — Seager, Tufte & Wickhem LLP

(57) ABSTRACT

A tool for providing a visualization of a system may reveal an interactive navigation environment for building performance observation and assessment. The tool may be associated with a processor. The environment may incorporate a treemap, a graph pane, a treemap filter, a graph pane selector, a selected units box and a date/time control mechanism. A visualization of the environment, among other things, may be presented on a display. The treemap may exhibit a building geometry and/or equipment units hierarchically, along with some data information. Units may be interactively selected from the treemap and placed in the box for analysis. The graph pane may show a configuration and display of unit analysis. Selection of detailed views for units in the box may be provided by the graph pane selector. Date and time intervals for analysis may be selected by the control mechanism.

20 Claims, 25 Drawing Sheets

Related U.S. Application Data continuation of application No. 13/621,188, filed on Sep. 15, 2012, now Pat. No. 8,947,437.

(56) References Cited

U.S. PATENT DOCUMENTS

| | | |
|---|---|---|
| 5,086,385 A | 2/1992 | Launey et al. |
| 5,566,084 A | 10/1996 | Cmar |
| 5,745,126 A | 4/1998 | Jain et al. |
| 5,751,916 A | 5/1998 | Kon et al. |
| 5,777,598 A | 7/1998 | Gowda et al. |
| 6,065,842 A | 5/2000 | Fink |
| 6,139,177 A | 10/2000 | Venkatraman et al. |
| 6,144,993 A | 11/2000 | Fukunaga et al. |
| 6,157,943 A | 12/2000 | Meyer et al. |
| 6,229,429 B1 | 5/2001 | Horon |
| 6,334,211 B1 | 12/2001 | Kojima et al. |
| 6,353,853 B1 | 3/2002 | Gravlin |
| 6,369,695 B1 | 4/2002 | Horon |
| 6,429,868 B1 | 8/2002 | Dehner, Jr. |
| 6,473,084 B1 | 10/2002 | Phillips et al. |
| 6,487,457 B1 | 11/2002 | Hull et al. |
| 6,580,950 B1 | 6/2003 | Johnson et al. |
| 6,598,056 B1 | 7/2003 | Hull et al. |
| 6,619,555 B2 | 9/2003 | Rosen |
| 6,704,012 B1 | 3/2004 | Lefave |
| 6,741,915 B2 | 5/2004 | Poth |
| 6,796,896 B2 | 9/2004 | Laiti |
| 6,801,199 B1 | 10/2004 | Wallman |
| 6,816,878 B1 | 11/2004 | Zimmers et al. |
| 6,876,951 B2 | 4/2005 | Skidmore |
| 6,889,096 B2 | 5/2005 | Spriggs et al. |
| 6,904,385 B1 | 6/2005 | Budike, Jr. |
| 6,907,387 B1 | 6/2005 | Reardon |
| 6,993,403 B1 | 1/2006 | Dadebo et al. |
| 6,993,417 B2 | 1/2006 | Osan, Jr. |
| 6,995,768 B2 | 2/2006 | Jou et al. |
| 7,023,440 B1 | 4/2006 | Havekost et al. |
| 7,031,880 B1 | 4/2006 | Seem et al. |
| 7,062,722 B1 | 6/2006 | Carlin et al. |
| 7,096,125 B2 | 8/2006 | Padmanabhan et al. |
| 7,110,843 B2 | 9/2006 | Pagnano et al. |
| 7,139,685 B2 | 11/2006 | Bascle et al. |
| 7,142,112 B2 | 11/2006 | Buckingham et al. |
| 7,164,972 B2 | 1/2007 | Imhof et al. |
| 7,183,899 B2 | 2/2007 | Behnke |
| 7,200,639 B1 | 4/2007 | Yoshida |
| 7,222,800 B2 | 5/2007 | Wruck |
| 7,228,234 B2 | 6/2007 | McNally et al. |
| 7,246,014 B2 | 7/2007 | Forth et al. |
| 7,257,397 B2 | 8/2007 | Shamoon et al. |
| 7,280,030 B1 | 10/2007 | Monaco |
| 7,292,908 B2 | 11/2007 | Borne et al. |
| 7,308,388 B2 | 12/2007 | Beverina et al. |
| 7,313,447 B2 | 12/2007 | Hsiung et al. |
| 7,334,472 B2 | 2/2008 | Seo |
| 7,346,433 B2 | 3/2008 | Budike, Jr. |
| 7,356,548 B1 | 4/2008 | Culp et al. |
| 7,378,969 B2 | 5/2008 | Chan et al. |
| 7,379,782 B1 | 5/2008 | Cocco |
| 7,383,148 B2 | 6/2008 | Ahmed |
| 7,434,742 B2 | 10/2008 | Mueller et al. |
| 7,496,472 B2 | 2/2009 | Seem |
| 7,512,450 B2 | 3/2009 | Ahmed |
| 7,516,490 B2 | 4/2009 | Riordan et al. |
| 7,548,833 B2 | 6/2009 | Ahmed |
| 7,557,255 B2 | 7/2009 | Wolf et al. |
| 7,557,729 B2 | 7/2009 | Hubbard et al. |
| 7,567,844 B2 | 7/2009 | Thomas et al. |
| 7,596,473 B2 | 9/2009 | Hansen et al. |
| 7,610,910 B2 | 11/2009 | Ahmed |
| 7,626,507 B2 | 12/2009 | LaCasse |
| 7,636,666 B2 | 12/2009 | Van Putten et al. |
| 7,646,294 B2 | 1/2010 | Kow et al. |
| 7,664,574 B2 | 2/2010 | Imhof et al. |
| 7,702,421 B2 | 4/2010 | Sullivan et al. |
| 7,705,854 B2 | 4/2010 | Abshear et al. |
| 7,720,306 B2 | 5/2010 | Gardiner |
| 7,729,882 B2 | 6/2010 | Seem |
| 7,734,451 B2 | 6/2010 | MacArthur et al. |
| 7,750,908 B2 | 7/2010 | Kincaid |
| 7,774,227 B2 | 8/2010 | Srivastava |
| 7,797,188 B2 | 9/2010 | Srivastava |
| 7,856,370 B2 | 12/2010 | Katta et al. |
| 7,873,443 B2 | 1/2011 | Noureldin et al. |
| 7,917,232 B2 | 3/2011 | McCoy et al. |
| 7,920,983 B1 | 4/2011 | Peleg et al. |
| 7,986,323 B2 | 7/2011 | Kobayashi et al. |
| 8,024,666 B2 | 9/2011 | Thompson |
| 8,041,744 B2 | 10/2011 | Heikkonen et al. |
| 8,086,047 B2 | 12/2011 | Penke et al. |
| 8,091,794 B2 | 1/2012 | Siddaramanna et al. |
| 8,095,112 B2 | 1/2012 | Chow et al. |
| 8,176,095 B2 | 5/2012 | Murray et al. |
| 8,180,710 B2 | 5/2012 | Strichman et al. |
| 8,239,073 B2 | 8/2012 | Fausak et al. |
| 8,285,603 B2 | 10/2012 | Carlin et al. |
| 8,289,390 B2 | 10/2012 | Aggarwal et al. |
| 8,312,549 B2 | 11/2012 | Goldberg et al. |
| 8,321,188 B2 | 11/2012 | Johnson et al. |
| 8,359,343 B2 | 1/2013 | McConnell |
| 8,515,878 B2 | 8/2013 | Radloff et al. |
| 8,565,902 B2 | 10/2013 | Jones et al. |
| 8,577,505 B2 | 11/2013 | Foslien et al. |
| 8,584,030 B2 | 11/2013 | Laycock et al. |
| 8,600,556 B2 | 12/2013 | Nesler et al. |
| 8,749,343 B2 | 6/2014 | Cirker |
| 8,756,024 B2 | 6/2014 | Hedley et al. |
| 8,760,519 B2 | 6/2014 | Ozdemir et al. |
| 8,947,437 B2 | 2/2015 | Garr et al. |
| 8,966,384 B2 | 2/2015 | Rye et al. |
| 9,135,807 B2 | 9/2015 | Cirker |
| 9,170,574 B2 | 10/2015 | Fuller et al. |
| 9,760,100 B2 * | 9/2017 | Garr ............ G06T 11/206 |
| 2002/0111698 A1 | 8/2002 | Graziano et al. |
| 2002/0130868 A1 | 9/2002 | Smith |
| 2003/0030637 A1 | 2/2003 | Grinstein et al. |
| 2003/0083957 A1 | 5/2003 | Olefson |
| 2003/0103075 A1 | 6/2003 | Rosselot |
| 2003/0171851 A1 | 9/2003 | Brickfield et al. |
| 2003/0214400 A1 | 11/2003 | Mizutani et al. |
| 2003/0233432 A1 | 12/2003 | Davis et al. |
| 2004/0143474 A1 | 7/2004 | Haeberle et al. |
| 2004/0168115 A1 | 8/2004 | Bauernschmidt et al. |
| 2004/0233192 A1 | 11/2004 | Hopper |
| 2004/0260411 A1 | 12/2004 | Cannon |
| 2005/0010460 A1 | 1/2005 | Mizoguchi et al. |
| 2005/0143863 A1 | 6/2005 | Ruane et al. |
| 2005/0267900 A1 | 12/2005 | Ahmed et al. |
| 2006/0009862 A1 | 1/2006 | Imhof et al. |
| 2006/0029256 A1 | 2/2006 | Miyoshi et al. |
| 2006/0058900 A1 | 3/2006 | Johanson et al. |
| 2006/0077255 A1 | 4/2006 | Cheng |
| 2006/0265664 A1 | 11/2006 | Simons et al. |
| 2007/0114295 A1 | 5/2007 | Jenkins |
| 2007/0120652 A1 | 5/2007 | Behnke |
| 2007/0139208 A1 | 6/2007 | Kates |
| 2007/0216682 A1 | 9/2007 | Navratil et al. |
| 2008/0036593 A1 | 2/2008 | Rose-Pehrsson et al. |
| 2008/0062167 A1 | 3/2008 | Boggs et al. |
| 2008/0144885 A1 | 6/2008 | Zucherman et al. |
| 2008/0229226 A1 | 9/2008 | Rowbottom et al. |
| 2008/0320552 A1 | 12/2008 | Kumar et al. |
| 2009/0088907 A1 | 4/2009 | Lewis et al. |
| 2009/0281677 A1 | 11/2009 | Botich et al. |
| 2010/0064001 A1 | 3/2010 | Daily |
| 2010/0156628 A1 | 6/2010 | Ainsbury et al. |
| 2010/0156630 A1 | 6/2010 | Ainsbury |
| 2010/0249955 A1 | 9/2010 | Sitton |
| 2010/0281387 A1 | 11/2010 | Holland et al. |
| 2010/0318200 A1 | 12/2010 | Foslien et al. |
| 2011/0029350 A1 | 2/2011 | Ronen et al. |
| 2011/0215945 A1 | 9/2011 | Peleg et al. |
| 2012/0198253 A1 | 8/2012 | Kato et al. |

(56) References Cited

U.S. PATENT DOCUMENTS

| | | |
|---|---|---|
| 2012/0262472 A1 | 10/2012 | Garr et al. |
| 2013/0055132 A1 | 2/2013 | Foslien |
| 2014/0046490 A1 | 2/2014 | Foslien et al. |

FOREIGN PATENT DOCUMENTS

| | | |
|---|---|---|
| JP | 7085166 | 3/1995 |
| JP | 11024735 | 1/1999 |
| JP | 11317936 | 11/1999 |
| JP | 2001356813 | 12/2001 |
| JP | 2005242531 | 9/2005 |
| JP | 2005311563 | 11/2005 |
| WO | WO 96/21264 | 11/1996 |
| WO | WO 2004/029518 | 4/2004 |
| WO | WO 2005/045715 | 5/2005 |
| WO | WO 2008/157755 | 12/2008 |
| WO | WO 2009/079648 | 6/2009 |
| WO | WO 2010/106474 | 9/2010 |

OTHER PUBLICATIONS

"Fuzzy Logic Toolbox 2.1, Design and Stimulate Fuzzy Logic Systems," The MathWorks, 2 pages, May 2004.
"Junk Charts, Recycling Chartjunk as junk art," 3 pages, Oct. 2, 2006.
"Model Predictive Control Toolbox 2, Develop Internal Model-Based Controllers for Constrained Multivariable Processes," The MathWorks, 4 pages, Mar. 2005.
"Statistics Toolbox, for Use with Matlab," User's Guide Version2, The MathWorks, 408 pages, Jan. 1999.
"Vykon Energy Suite Student Guide," Iridium Inc., 307 pages, Mar. 3, 2006.
"Web Based Energy Information Systems for Energy Management and Demand Response in Commercial Buildings," California Energy Commission, 80 pages, Oct. 2003.
Andover Controls World, 4 pages, Spring 1997.
Andover Controls, Network News, vol. 2, No. 2, 8 pages, 1997.
Ashrae Dashboard Research Project, 29 pages, Aug. 28, 2008.
Ball, "Green Goal of 'Carbon Neutrality' Hits Limit," TheWall Street Journal, 7 pages, Dec. 30, 2008.
Bell et al., "Early Event Detection-Results from a Prototype Implementation," AICHE Spring National Meeting, 15 pages, Apr. 2005.
Cadgraphics, "The Cadgraphics User's Guide," 198 pages, 2003.
Carrier Comfort Network CCN Web, "Web Browser User Interface to the Carrier Comfort Network," 2 pages, 2002.
Carrier Comfort Network CCN Web, Overview and Configuration Manual, 134 pages, Apr. 2006.
Carrier Comfort Network CCN Web, Product Data, 2 pages, Apr. 2006.
Carrier, "i-Vu Powerful and Intuitive Front End for Building Control," 2 pages, Aug. 2005.
Carrier, "i-Vu Web-Based Integrated Control System," 3 pages, 2005.
Carrier, Demo Screen Shots, 15 pages, prior to Aug. 27, 2007.
Carrier, i-Vu CCN 4.0, Owner's Guide, 20 pages, Jul. 2007.
Carrier, i-Vu CCN, 7 pages, 2007.
Chan, "Rank Revealing QR Factorizations," Linear Algebra and It's Applications, vol. 88-89, pp. 67-82, Apr. 1987.
Circon, "i-Browse Web-Based Monitoring and Control for Facility Management," 2 pages, prior to Aug. 27, 2007.
Published Australian Application 2009904740, 28 pages, Application Filed on Sep. 29, 2009.
Echelon, "Energy Control Solutions with the i.Lon SmartServer," 4 pages, 2007.
Echelon, "i.Lon 100e3 Internet Server Models 72101R-300, 72101R-308, 72102R-300, 72103-R300 . . . " 5 pages, copyright 2002-2007.
Echelon, "i.Lon 100e3 Internet Server New Features," 15 pages, Sep. 2006.
Echelon, "i.Lon SmartServer," 5 pages, 2007.
Honeywell News Release, "Honeywell's New Sysnet Facilities Integration System for Boiler Plant and Combustion Safety Processes," 4 pages, Dec. 15, 1995.
Honeywell, "Excel Building Supervisor-Integrated R7044 and FS90 Ver. 2.0," Operator Manual, 70 pages, Apr. 1995.
Honeywell, "Product Guide 2004," XP-002472407, 127 pages, 2004.
Honeywell, "Introduction of the S7350A Honeywell WebPAD Information Appliance," Home and Building Control Bulletin, 2 pages, Aug. 29, 2000; Picture of WebPad Device with touch screen, 1 Page; and screen shots of WebPad Device, 4 pages.
Honeywell, Excel 15B W7760B Building Manager Release 2.02.00, Installation Instructions, 28 pages, Dec. 2004.
Honeywell, The RapidZone Solution, Excel 5000 Open System, Application Guide, 52 pages, Jan. 2004.
http://pueblo.lbl.gov/~olken . . . ,"Remote Building Monitoring and Operations Home Page," 5 pages, prior to Aug. 27, 2007.
http://web.archive.org/web/20100219193741/http://www.energyworksite.co . . . , "Energy Worksite," 3 pages, printed Aug. 16, 2013.
http://www.commercial.carrier.com/commercial/hvac/productdescription . . . , "Carrier: i-Vu CCN," 1 page, printed Mar. 11, 2008.
http://www.commercial.carrier.com/commercial/hvac/productdescription . . . ,"Carrier: 33CSCCNWEB-01 CCN Web Internet Connection to the Carrier Comfort Network," 1 page, printed Mar. 11, 2008.
http://www.docs.hvacpartners.com/idc/groups/public/documents/techlit/gs-controls-ivuccn.rtf, "Products," 5 pages, printed Jul. 3, 2007.
http://www.lightstat.com/products/istat.asp, Lightstat Incorporated, "Internet Programmable Communicating Thermostats," 1 page, printed Mar. 13, 2007.
http://www.sharpsystems.com/products/pc_notebooks/actius/rd/3d/, "Actius RD3D Desktop Replacement Notebook with Industry-Breakthrough 3D Screen," Sharp, 1 page, printed Jun. 16, 2005.
http://www2.sims.berkeley.edu/courses/is213/s06/projects/lightson;final.html, "Lights On A Wireless Lighting Control System," 11 pages, printed Mar. 22, 2007.
i.Lon 100e3 Internet Server, 1 page, prior to Aug. 27, 2007.
i.Lon, SmartServer, 2 pages, prior to Aug. 27, 2007.
i-stat, Demo Screen Shots, 9 pages, printed Mar. 13, 2007.
i-stat, The Internet Programmable Thermostat, 2 pages, prior to Aug. 27, 2007.
Johnson Controls, Network Integration Engine (NIE) 3 pages, Nov. 9, 2007.
Johnson Controls, Network. Integration Engine (NIE), Product Bulletin, pp. 1-11, Jan. 30, 2008.
Kourti, "Process Analysis and Abnormal Situation Detection: From Theory to Practice," IEEE Control Systems Magazine, pp. 10-25, Oct. 2002.
Lucid Design Group, Inc., "Building Dashboard," 2 pages, Printed May 30, 2013.
Mathew, "Action-Oriented Benchmarking, Using CEUS Date to Identify and Prioritize Efficiency Opportunities in California Commercial Buildings," 26 pages, Jun. 2007.
Morrison, "The Early Event Detection Toolkit," Honeywell Process Solutions, 14 pages, Jan. 2006.
Narang, "WEBARC: Control and Monitoring of Building Systems Over the Web," 53 pages, May 1999.
Olken et al., "Object Lessons Learned from a Distributed System for Remote Building Monitoring and Operation," ACM SIGPLAN Notices, vol. 33, No. 10, pp. 284-295, Oct. 1998.
Proliphix, Inc., "Proliphix IP Devices: HTTP API," 28 pages, Jan. 23, 2006.
Proliphix, Inc., Remote Management User Guide, 12 pages, prior to Aug. 27, 2007.
Rogan et al, "Smart and Final Food Stores: A Case Study in Web Based Energy Information and Collection," Web Based Energy Information and Control Systems: Case Studies and Application, Chapter 6, p. 59-64, 2005.
Sharp, "Actius AL3DU 3D LC Display High Performance 3D Visualization," 2 pages, prior to Mar. 17, 2006.

(56) References Cited

OTHER PUBLICATIONS

So et al., "Building Automation on the Information Superhighway," ASHRAE (American Society of Heating Refrigerating, and Air Conditioning) Transactions, vol. 104, Part 2, pp. 176-191, 1998.
So et al., "Building Automation Systems on the Internet," Facilities vol. 15, No. 5/6, pp. 125-133, May/Jun. 1997.
Talon, "Raptor Controller," 6 pages, Oct. 2003.
Talon, "Workstation Software," 4 pages, Nov. 2002.
Trane, "System Programming, Tracer Summit Version 14, BMTW-SVP01D-EN," 623 pages, 2002.

\* cited by examiner

INTERACTIVE NAVIGATION ENVIRONMENT FOR BUILDING PERFORMANCE VISUALIZATION

This application is a continuation of U.S. patent application Ser. No. 14/594,912, filed Jan. 12, 2015, which is a continuation of U.S. patent application Ser. No. 13/621,188, filed on Sep. 15, 2012, now U.S. Pat. No. 8,947,437, issued on Feb. 3, 2015. U.S. patent application Ser. No. 13/621,188, filed on Sep. 15, 2012, now U.S. Pat. No. 8,947,437, issued on Feb. 3, 2015, is hereby incorporated by reference. U.S. patent application Ser. No. 14/594,912, filed Jan. 12, 2015, is hereby incorporated by reference.

BACKGROUND

The present disclosure pertains to navigation mechanisms and particularly to mechanisms for information and analysis purposes.

SUMMARY

The disclosure reveals a tool for providing a visualization of a system which may have an interactive navigation environment for building performance observation and assessment. The tool may be associated with a processor. The environment may incorporate a treemap, a graph pane, a treemap filter, a graph pane selector, a selected units box and a date/time control mechanism. A visualization of the environment, among other things, may be presented on a display. The treemap may exhibit a building geometry and/or equipment units hierarchically, along with some data information. Units may be interactively selected from the treemap and placed in the box for analysis. The graph pane may show a configuration and display of unit analysis. Selection of detailed views for units in the box may be provided by the graph pane selector. Date and time intervals for analysis may be selected by the control mechanism.

DESCRIPTION

Figure 1:
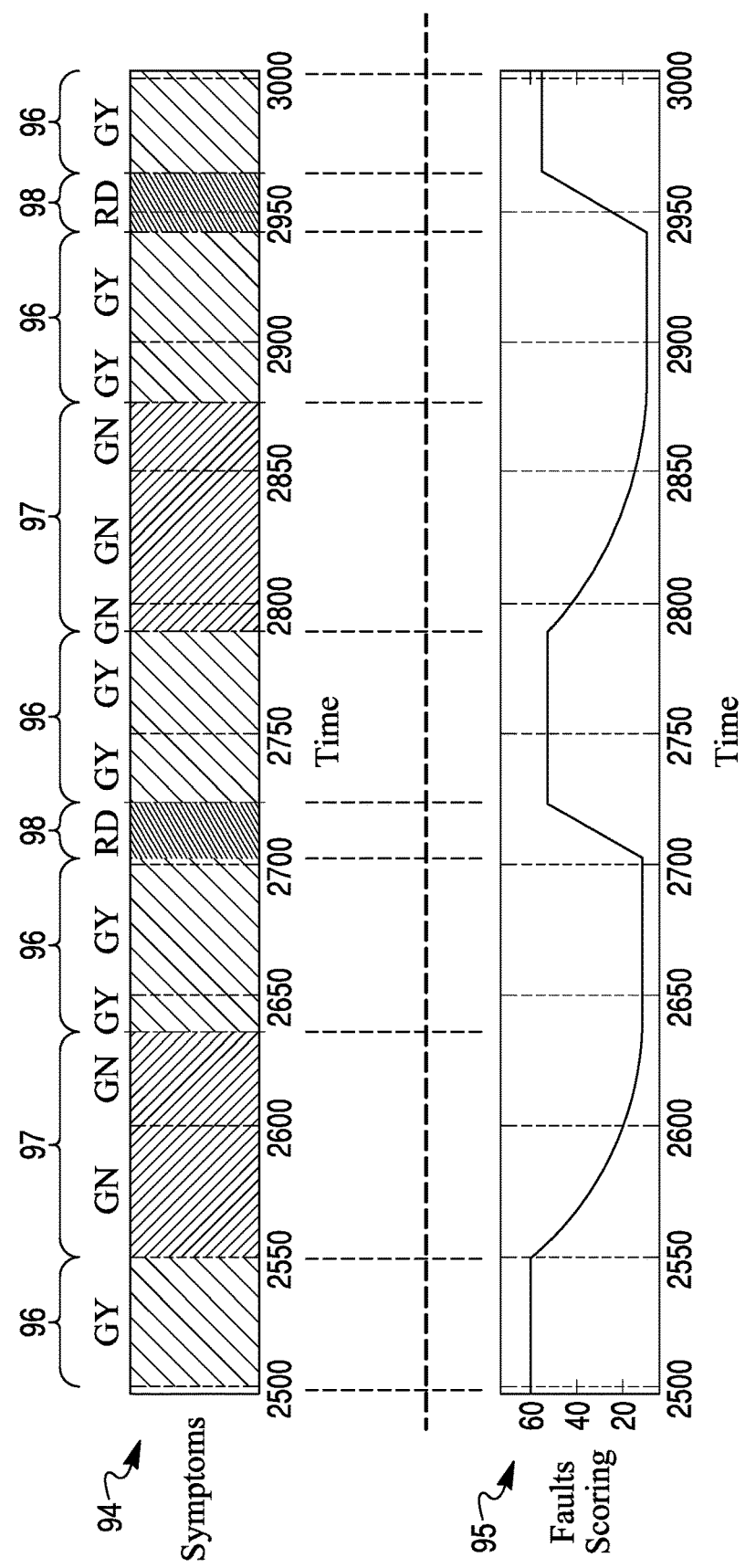
FIG. 1 is a diagram of plot that illustrate fault relevancy and/or indications of abnormal behavior.

Commercial building heating ventilation and air conditioning (HVAC) systems may seldom run at optimal efficiency. Rather, suboptimal control strategies, equipment degradation, and hardware faults may lead to excessive energy consumption and poor thermal comfort. Many modern HVAC systems may be equipped with remotely accessible sensor networks and controllers that provide the opportunity for off-site analysis and control to address inefficiencies and operating errors.

Organizations such as a Global Service Response Center (GSRC) may perform the role of remote analysis and system optimization. However, energy analysts may tend to lack effective tools to support their analysis processes, making it more difficult to recommend effective energy conservation measures (ECMs). Specific analytical challenges, based on conversations and site meetings with energy analysts, may incorporate data overload, difficulty in comparing performance of similar equipment, difficulty in finding building zones of particular interest, and a lack of context for data.

Data overload from large unstructured data warehouses may prevent comprehensive analysis. Conclusions may typically be made based on a subset of available data. There may be issues in comparing performance of similar pieces of equipment, similar buildings, or similar zones. There may also be issues in finding which building zones or pieces of HVAC equipment are of particular interest due to poor thermal comfort, faulty operation or inefficient performance. There may be a lack of context for data that makes it difficult to understand how zones or HVAC equipment fit into an overall building or HVAC system.

Effective analysis of commercial building HVAC system performance may therefore require not only raw data and analytic algorithms, but also a system that filters, provides context for, and displays visually effective presentations of data and analytic results.

The energy analysts' workflow may be based on manual creation of graphs from off-line data. Analytic prototypes may have presented results in many independent plots. The present approach may have an interactive visualization environment that addresses the challenges outlined above, allowing analysts to build an integrated understanding of raw data and analytic results in support of more effective analysis and ECM recommendations. Requirements for extensive domain knowledge may be reduced over time with the integration of additional analytics that automate the reasoning that has traditionally only come with years of energy analysis experience.

The present approach may address the challenges described above by providing energy analysts with an interactive environment that provides capabilities to filter, contextualize, and visualize raw data and analytic results. The tool may thereby allow an energy analyst to more quickly discover, focus on, and understand information pertinent to the analysis task at hand.

The disclosure may reveal the features of analytic-based filtering. Building energy performance data may be presented and filtered using analytic results. The analysis workflow may be redefined such that the first step in the process is to filter by a particular analytic, such as automated fault detection and diagnostics (AFDD), control inefficiency monitoring, or energy consumption monitoring. Selecting an analytic type may bring up context-specific menus and filters that allow the analyst to see results and compare them among various HVAC systems or building zones.

A treemap visualization may be used to present summary analytic results, guide detailed analysis, allow for dynamic filtering of results, and allow selection of specific HVAC components or building zones for a more detailed comparison.

There may be a navigation web and HVAC and building-geometry hierarchies. The treemap may be structured according to a number of hierarchies, each derived from a navigation web that defines linkages among pieces of building equipment and between equipment and zones. Two hierarchies may be derived from the web: 1) a building geometry hierarchy; and 2) HVAC equipment hierarchy (connectivity model). Although the treemap may virtually always be structured according to one of these hierarchies, connections to linked equipment or zones are possible based on the structure in the underlying navigation web.

The hierarchy used to organize the treemap may be dependent on the analytic selected. For example, viewing fault detection results for AHUs may indicate use of the AHU HVAC hierarchy for treemap structure. Viewing thermal comfort results, which pertain most strongly to building zones, may indicate use of the building geometry hierarchy for treemap structure.

Linked analytic results and trend data may be noted. In a detailed graph view, analytic results may be expanded to show the underlying trend data that lead to an analytic result. For example, AFDD results may be based on detected symptoms, which are in turn based on a number of data streams. A timeline plot showing a symptom may be expanded to show the sensor data that lead the analytic engine to determine the presence of that symptom. This capability may allow the analyst to build confidence in the analytic engines, by directly analyzing the underlying data.

The present approach may be substantially different from the cited art in that typically, building analysis may have been carried out using an ad-hoc collection of tools, such as Microsoft Excel, used to create time-series plots of data. Adding contextual information, making comparisons, and even accessing data may incorporate individual manual steps. Some existing building management tools may partially address the issue, in that it incorporates capabilities for online, direct data access, and visualization of data series in line plots. However, the contextual structure, analytic filtering, hierarchical structuring and advanced visualizations put forth herein may be absent from many such systems.

There may be building energy "dashboard" systems with more advanced visualization types. However, these tools do not necessarily appear to include detailed HVAC performance data nor the analytics integrated into the present approach, focusing rather on energy consumption figures. Further, the present navigation approach may be substantially different than those present in commercially available tools.

The present approach may be implemented as an interactive application with a connection to a data warehouse of raw data, analytic results, and metadata such as system/zone characteristics and hierarchical relationships among them. The principal components of the environment may incorporate a treemap filter, a treemap, selected-units box, graph pane selector, and a graph pane.

First, as to a treemap filter, there may be a collection of dropdown boxes, sliders, and other controls that allow the analyst to select the analytic results to be displayed in the treemap pane. Based on the analytic selected, a context-sensitive set of controls may be displayed, and a specific hierarchy for displaying the treemap may be used.

Second, as to a treemap, it may provide a visualization that displays hierarchical data by using nested rectangles with color, size, and text labels conveying characteristics of each node. The treemap may be used to display summary analytic results according to the parameters selected in the treemap filter and to allow drill down and selection of entities for detailed analysis.

Third, as to a selected-units or components box, it may be a box that serves as a container for any entity or collection of entities selected from the treemap. The active entities in the selected-units box may be used for visualization in the graph pane. Check boxes may be provided in the box for activation or deactivation of each entity. The box may also provide for interactive timeline selection in the detailed graph pane mode.

Fourth, as to a graph pane selector, it may allow the analyst to select the view displayed in the main graph pane. Two classes of views may be available. A detailed view may be based on the heatmap timeline concept, and the graph pane selector may additionally provide control over time duration for display in this case. A summary view may incorporate a number of visualizations that are further configured via controls in the graph pane itself.

Fifth, as to a graph pane, it may be the primary area for presentation of detailed data or analytic results. Based on the active units in the selected units box, and the view selected in the graph pane selector, a graph consisting of pie charts, line (trend) plots, profiles, heatmap timelines (disclosure H0028379), or other visualizations may be displayed in the graph pane.

The target audience for the present approach may be an energy analyst responsible for monitoring building energy performance. The tool may eventually replace the ad-hoc graph creation procedures often having been used. A number of use cases describing specific potential analysis sessions with the tool are described herein.

The following use cases may support the interactive navigation environment for building performance visualization. The cases may provide additional insight into how the visualization/navigation tool proposed would be used by energy analysts. The use cases are not necessarily intended to be comprehensive. The present tool may allow analysts to explore data and analytic results; so no two sessions are likely to be the same.

A first use case may pertain to unstructured search for energy conservation measures (ECMs). Here, the analyst may want to find a poor-performing building in a portfolio of managed buildings, and evaluate the reasons for the poor performance. Therefore, the analyst may begin in an open-minded exploratory mode. The steps in an analysis may be first to identify a building of interest, then find operational issues in the HVAC equipment, and finally identify potential energy conservation measures. In performing the evaluation, the analyst may apply domain expertise and professional experience in interpreting the analytic results and trend data displayed in the visualization tool.

The analyst may begin the session by opening a web browser and entering the URL to bring up the web-based application. The default view in the application may show a treemap where color is coded according to energy use per square foot, with the most energy-intense facilities shown in red, and the least energy intense facilities in green.

The treemap may be organized according to the building geometry hierarchy. Virtually all facilities that analysts have access to, may be shown by default, with a first or top level of the treemap showing the enterprise, a second level showing the individual sites, and a third level showing buildings within the sites. Further decomposition to lower levels (e.g., fourth, fifth and so on) of the building hierarchy (floors and zones) may be suppressed until the analyst elects to "drill down" for more detail.

The analyst may double-click on the treemap on a site showing high energy consumption. This action changes the treemap view such that the top level is now the chosen site, divided by building and subsequently by floor, for buildings that have the requisite submetering for this level of fidelity. The analyst may see that one floor is particularly energy intense, and may want to know why.

Now, the connection between the building hierarchy and HVAC hierarchy may become vital. Hierarchies may be tied together. An analyst may right-click on the floor in the diagram, and may select "Show linked AHUs". The other options may be "Show Linked Chillers" and "Show Linked Boilers". The treemap view may be redrawn such that the top level is now the selected floor, and the AHUs that serve the floor are shown as children of that floor. Variable air volume units (VAVs) linked to the AHUs and servicing the floor may be shown as children of the AHU.

At this point, the analyst may have completed the equipment selection process and may be ready to begin a detailed analysis session. The analyst may, for instance, select an analytic of interest, and a system type for analysis, such as automated fault detection and diagnostics (AFDD) and air handling units (AHUs), respectively. The current AFDD status for each AHU may be shown in the treemap, and a display of VAVs may be suppressed. Wishing only to focus on high-fault AHUs, the analyst may further filter results with a slider bar, setting minimum fault relevancy to 50 percent. The treemap may then be updated to show just high fault relevancy air handling units. The analyst may choose virtually all of the remaining AHUs, by dragging the "floor" rectangle from the treemap (which contains the remaining AHUs) to the selected-units pane.

A concept of "fault relevancy" may be based upon an observation that it can be difficult to say for sure that a fault is or is not present in a system. For example, some data may indicate the fault; some other data may not indicate the fault. Or abnormal behavior may be present for too short time to say for sure that "the fault is present in the system". This uncertainty may be captured by "fault relevancy" concept.

The present system and approach, as described herein and/or shown in the Figures, may incorporate one or more processors, computers, controllers, user interfaces, wireless and/or wire connections, and/or the like, wherever appropriate or desired.

In FIG. 1, one may note that a plot 94 shows symptoms versus time to illustrate fault relevancy. Plot 94 may show when abnormal behavior was observed, i.e., red (RD) intervals 98; when the system worked properly even if the abnormal behavior could have been detected, i.e., green (GN) intervals 97; and when there is not enough information to decide abnormal behavior, i.e., grey (GY) intervals 96.

A plot 95 in FIG. 1 shows faults scoring versus time. The time coordinate may be aligned with the time coordinate of plot 94. A fault score may increase and decrease based on observed behavior.

If abnormal behavior is observed long enough, a fault relevancy index may reach 100 percent. If normal behavior is observed long enough, the fault relevancy index may go to 0 percent. The index may be computed for each fault.

If no symptoms are observed, fault relevancy may decrease over the time. If canceling symptoms are observed, fault relevancy may decrease over the time. If causing symptoms are observed, fault relevancy may increase over the time. In other words, symptoms may precede faults. Generic numerical analytic results computed over some time may be the primary contents visualized by the system presented.

The graph pane may now show a summary view displaying a matrix detailing the fault relevance of each fault category for each currently active, for example, AHU. The analyst may compare the fault status in all of the three selected AHUs simultaneously and see that virtually all of these AHUs appear to suffer from leaking heating valves and control strategy failures. The analyst may make a note of this and export the graph for possible inclusion in a report. The analyst may now switch to the detailed view, which shows heatmap timelines for the three AHUs. The analyst may drill down to view the timelines showing leaking heating valves and control strategy failures, and then to the trend data underlying the AFDD report. Based on the analyst's domain knowledge, the analyst may conclude that the more likely issue is a control strategy failure than a leaking heating valve. The analyst may export this graph for inclusion in a report.

Based on the control strategy failure reported in the AFDD chart, and corroborated with domain knowledge, the analyst may be curious if these AHUs also suffer from control inefficiency. The analyst may therefore select a summary view of control inefficiencies from the graph pane selector. A graph may be presented with pie charts showing control inefficiencies aggregated over the previous month, although options may be available for arbitrary amounts of time. A high proportion of extra heating may be reported, possibly explaining why the AFDD engine concludes that there is a high chance of a leaking heating valve. The analyst may export this graph for inclusion in a report.

The analyst may conclude that the control strategy for the AHUs serving the floor of this energy-inefficient building should be examined for possible changes to the sequence of operations. Based on the analyst's level of knowledge, the analyst may recommend potential changes or direct a report to the appropriate personnel for implementation of changes to the control strategy.

In a second use case, concerning thermal comfort complaints, the building manager may have received complaints from building occupants in a specific zone. After opening the analysis tool in a web browser, an analyst may choose the thermal comfort analytic from the treemap filter, and set a slider control to show zone areas with poor thermal comfort results. The analyst may drill down using the treemap to the specific zone by first double-clicking on the building of interest.

The analyst may notice that the zone, from where the complaints came, has poor thermal comfort, and that some of the adjoining zones on the same floor may have poor thermal comfort as well. The analyst may drag the entire floor of interest into a selected units or items box, and use the graph pane selector to see a detailed view, configuring the timelines to show thermal comfort over the past six months. Comfort, for example, may be regarded as having been an increasing issue in the past two months. The analyst may make a note of this and export the view for inclusion in a report.

The analyst may note whether thermal comfort issues are related to HVAC equipment concerns. In the cooling season, the analyst may be interested in chiller and AHU performance, so the analyst may bring up control inefficiency monitoring for chillers and AHUs, using the treemap's links from building to HVAC hierarchies to find the equipment of interest. The analyst may find that the two chillers serving the zones of interest have a number of faults, and may hypothesize that these are responsible for the thermal comfort issues. The analyst may make a note of this, export the view for a report, and consider dispatching a technician for chiller repair.

In a third use case, concerning investigating and comparing boilers in a specific facility, a building owner may be interested in understanding the energy impact of a recent retrofit and maintenance program. To support this analysis task, a GSRC analyst may navigate the treemap, initially structured according to building geometry. The analyst may right-click on the building of interest, and may select "Show Linked Boilers". This action may change the treemap view so that the building is the top level, with boilers at the first level of decomposition, AHUs at the second level, and VAVs at the third level. The analyst may drag the three boilers to the selected-units box, and set the graph pane selector to the detailed view option. The resulting heatmap timeline may show AFDD results by default. Near a time of maintenance, the maximum fault relevancy for all three boilers may have dramatically decreased, with no recent resurgence. Checking the aggregate control inefficiency over the past month, the boilers may show a 95 percent correct mode operation, which appears significantly better than most equipment that this analyst has seen.

The analyst may export the graphs for inclusion in a report and report to the building owner that the maintenance issues appear to have been successfully addressed.

The Figures noted herein may reveal key components of the present "interactive navigation environment for building energy performance visualization" (INEFBEPV). A visualization tool may fit into an analysis and control environment. Components, as noted herein, may involve a treemap filter, treemap hierarchical structure, treemap data presentation, a treemap component selection and selected units box, graph pane selector, and a main graph pane. Diagrams of the Figures may show examples of how the interactive navigation environment may be configured to show results from a number of different analytics.

Figure 2:
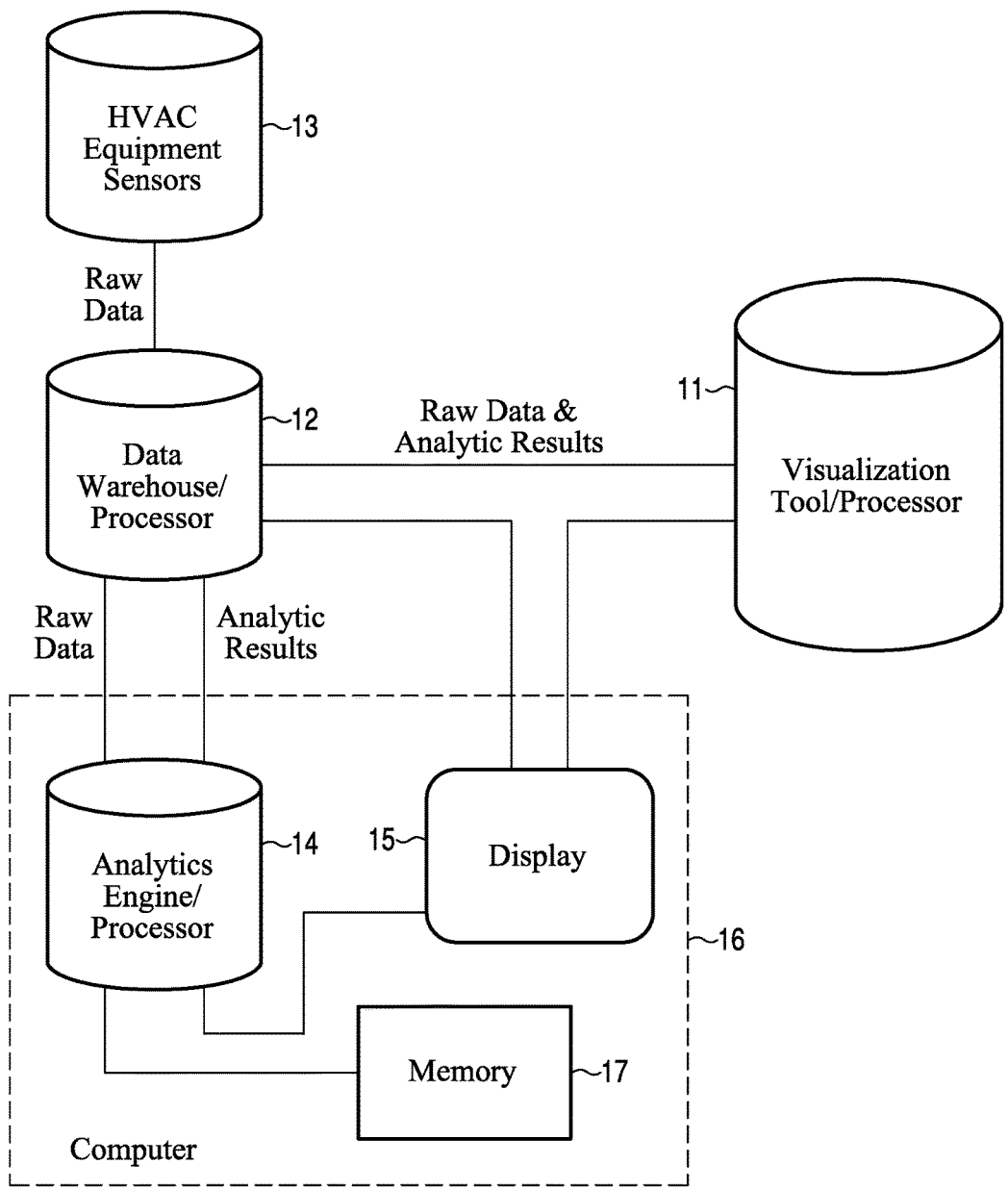
FIG. 2 is a diagram of a basic architecture associated with of a visualization tool.

FIG. 2 is a diagram of a basic architecture associated with of the visualization system or tool/processor 11. The system or tool 11 may be a part of a larger integrated system. Tool 11 may be connected to a data warehouse/processor 12 where raw data, processed analytic results, and metadata including system/zone characteristics and hierarchical relationships among systems and zones are stored. HVAC equipment sensors 13 may provide raw data to data warehouse 12. An analytics engine/processor 14 may process raw data from data warehouse 12 and provide analytic results to data warehouse 12. The raw data and analytic results may go to tool 11 for visualization. Tool 11, data warehouse 12 and analytics engine 14 may be connected to a display 15. Analytics engine 14 may be connected to a memory 17. Tool 11 may extend a "building performance monitoring tool" client in a number of ways including a more advanced visualization, facilities for comparison across HVAC systems or building zones, and in the display of advanced analytics as opposed to raw sensor data. Analytics engine/processor 14, display 16 and memory 17 may be incorporated by a computer 16.

Figure 3:
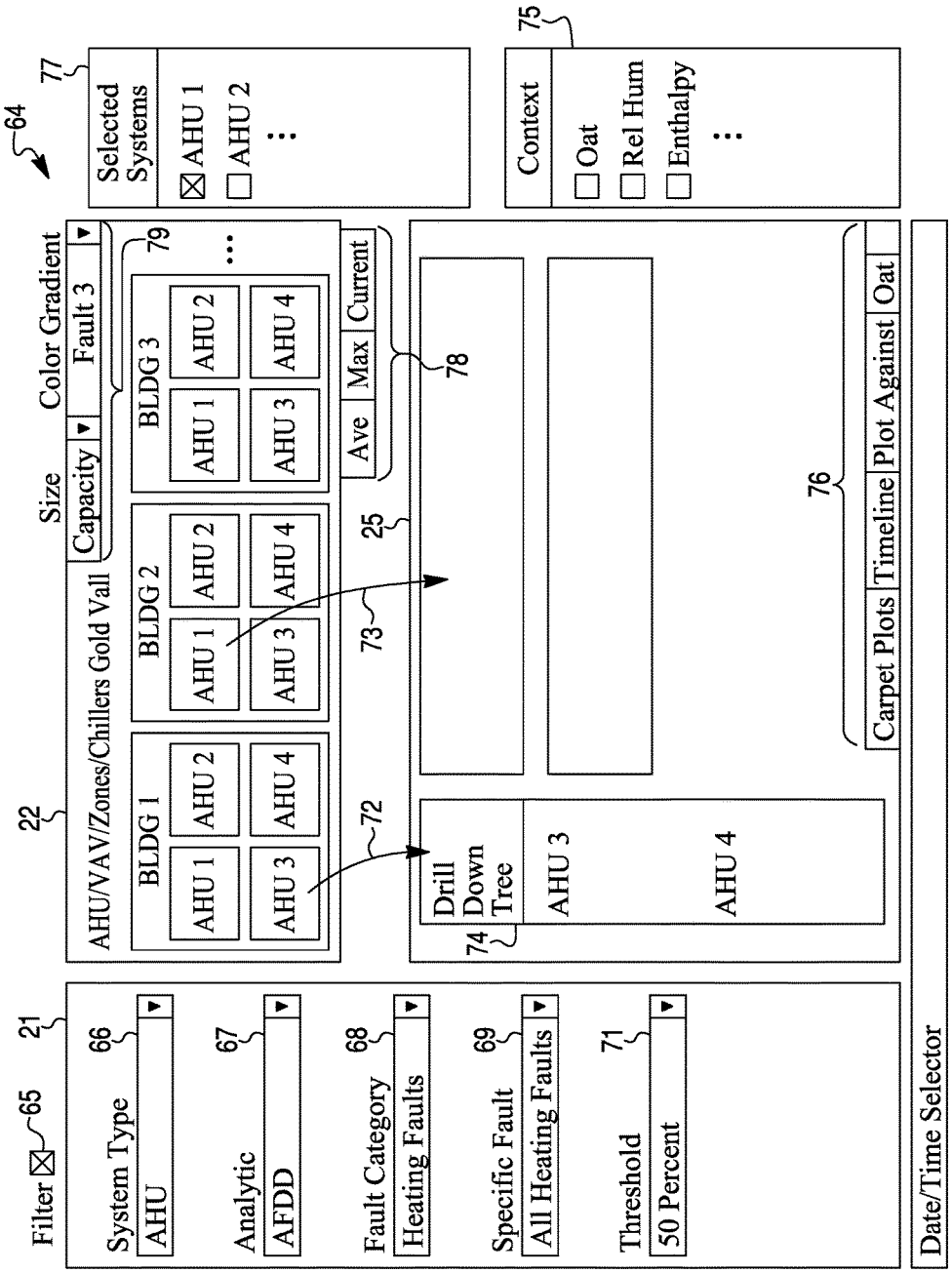
FIG. 3 is a diagram of screen display showing a treemap 22, a graph pane and a treemap selector 21.

FIG. 3 is a diagram of screen display 64 of a treemap 22, a graph pane 25 and a treemap selector 21. Selector 21 may incorporate a filter or treemap selector box 65. If box 65 is not selected, then the filter or selector 21 may be deactivated and the full building hierarchy may be yielded in treemap 22. With box 65 selected, then further selecting may be done within filter or selector 21. For instance, system type in a bar 66 may be selected from a group of items incorporating an AHU, chiller, VAV, boiler, and so on. An analytic may be selected from a bar 67 which may incorporate AFDD, comfort monitoring, control inefficiency, and so on. A fault category may be selected from a bar 68 which may incorporate heating faults, cooling faults, valve faults, and so on. A specific fault may be selected from a bar 69 which may incorporate various faults of the fault category selected in bar 68, which for the presently shown category selection of heating faults, may incorporate all heating faults, certain specific heating fault or faults, and so on. A category selection of cooling faults may result in bar 69 to incorporate all cooling faults, certain a specific cooling fault or faults, and so on. Bar 71 may provide for a threshold percentage selection which may be correlated to a fault relevancy. The selection at bar 71 may range from 0 to 100 percent. Selector 21 may be a context sensitive filter in that the field selections 66-69 can change based on the analytic selected at bar 67.

A hierarchy of AHUs may appear in treemap 22 as a result of the selections in treemap selector 21. With the selection made relative to AHUs. AHUs 1-M may be shown in buildings 1-N, wherein M may be the total number of AHUs in the respective buildings and N may be the total number of buildings represented in treemap 22. A drill-down may be performed on an AHU by clicking on the AHU, for example, as indicated by an arrow 72 leading to a drill down tree 74. Drill down may be performed on one of the AHUs shown in tree 74. Tree 74 may be obtained from a treemap 22 or any other unit selector, but be filtered by a selection of units and fault types selected in the filter of treemap selector 21 of treemap 22. A drill down tree may permit a drill down to symptoms of a unit. Clicking on an AHU, for example, may lead to pane 25 having a graph of a characteristic, parameter, or the like, of the AHU as indicated by an arrow 73. The graph may be a heatmap timeline or thread, which may be obtained from the SILVERLIGHT™ or other demo. Other visuals, such as scatter plots and so on, may be considered in graph pane 25. Pane 25 may also have a facility to display contextual data such as outside air temperature (OAT), occupancy, relative humidity, enthalpy, and so on, which may be selected in a context selector 75. Bar 76 may be a chart type selector with items of carpet plots, timeline, plot against a selected item, OAT, and so on. Selected systems box 77 may permit a selection of a system from a group of items such as an AHU 1, AHU 2, and so on. Treemap 22 may display a maximum/current fault status for units passing the filter. A change of the displayed value may be permitted while maintaining a selected group of equipment, which can be applicable to analytics and raw data. Bar 78 may be an aggregation type selector having types such as average, maximum, current, and so on. At the top of the treemap 22, the kinds of items which may be a subject of treemap 22, incorporate such as AHUs, VAVs, zones, chillers, and so on. The location of such items may be noted, for example, that of Golden Valley, Anywhere, U.S.A. A top selection bar 79 of treemap 22 may provide for such things as capacity, fault, color gradient, and so forth. Bar 79 may allow a user to select which data attribute is visualized by the size of the treemap 22 components, and which data attribute is visualized by the color of the treemap components. Such attributes may be a (selected) fault relevancy, unit capacity, date of commissioning, and so on. That is, both color and size may indicate virtually any of the entity's properties.

Figure 4:
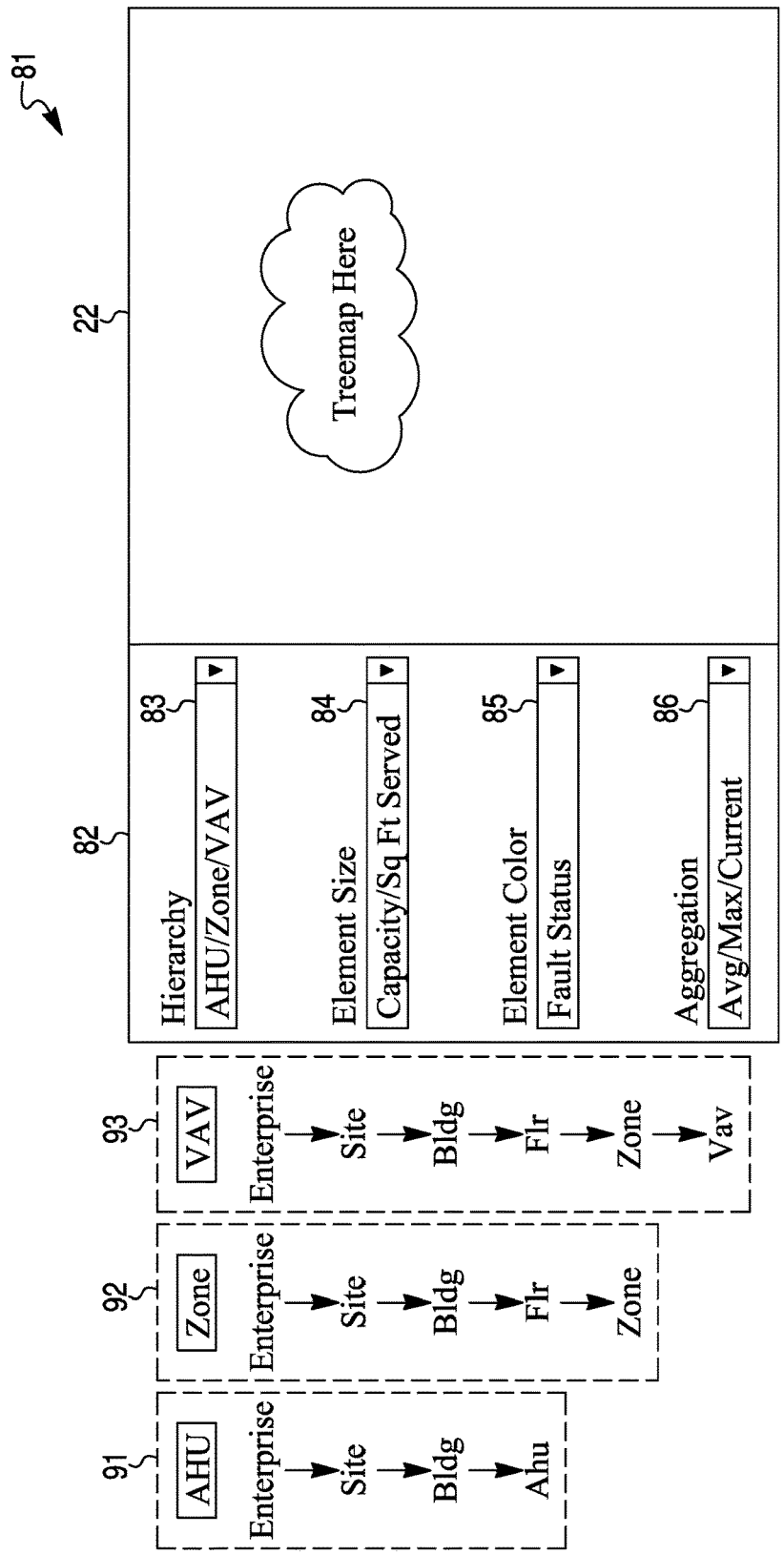
FIG. 4 is a diagram of a screen display having an example treemap and a hierarchy selector.

FIG. 4 is a diagram of a screen display 81 having an example treemap 22 and a hierarchy selector 82. Bar 83 may provide for selecting in how the hierarchy is displayed with one selection indicating "AHU/ZONE/VAV". Examples of other hierarchies are shown in dashed boxes 91, 92 and 93. Box 91 for an AHU shows "enterprise→site→bldg→AHU". Box 92 for a zone shows "enterprise→site→bldg→flr→zone". Box 93 for a VAV shows "enterprise→site→bldg→flr→zone→VAV". Bar 84 for element size may indicate capacity in terms of measurement units for the various selected items. For instance, the defaults for AHU may be capacity/airflow, zone may be square feet, VAV may be zone square feet, and other items or components may have respective measurements. Bar 85 for element color may have a selection for fault status. Bar 85 may be used in lieu of a filter in a first demo for selection of status. Defaults may be based on filter type. An AFDD engine may select a current top-level fault. Virtually all data fields may be associated with a system/zone/ . . . to be displayed. Collections of data points may be necessitated to be accessible in a data warehouse by the system/zone.

Bar 86 may be used for selecting a type of aggregation such as average, maximum, current, and so on. Other ideas may be considered. Example ideas may be trends shown in treemap cells if one looks to the future. One may consider selecting current for control efficiency. One may look to see how the aggregation selection squares with online versus offline usage. One might aggregate at correct (incorrect) averaged values for control inefficiency. A selection of maximum appears not likely useful for control inefficiency for aggregation. The selection should be context sensitive so as to allow aggregations that make sense.

Figure 5:
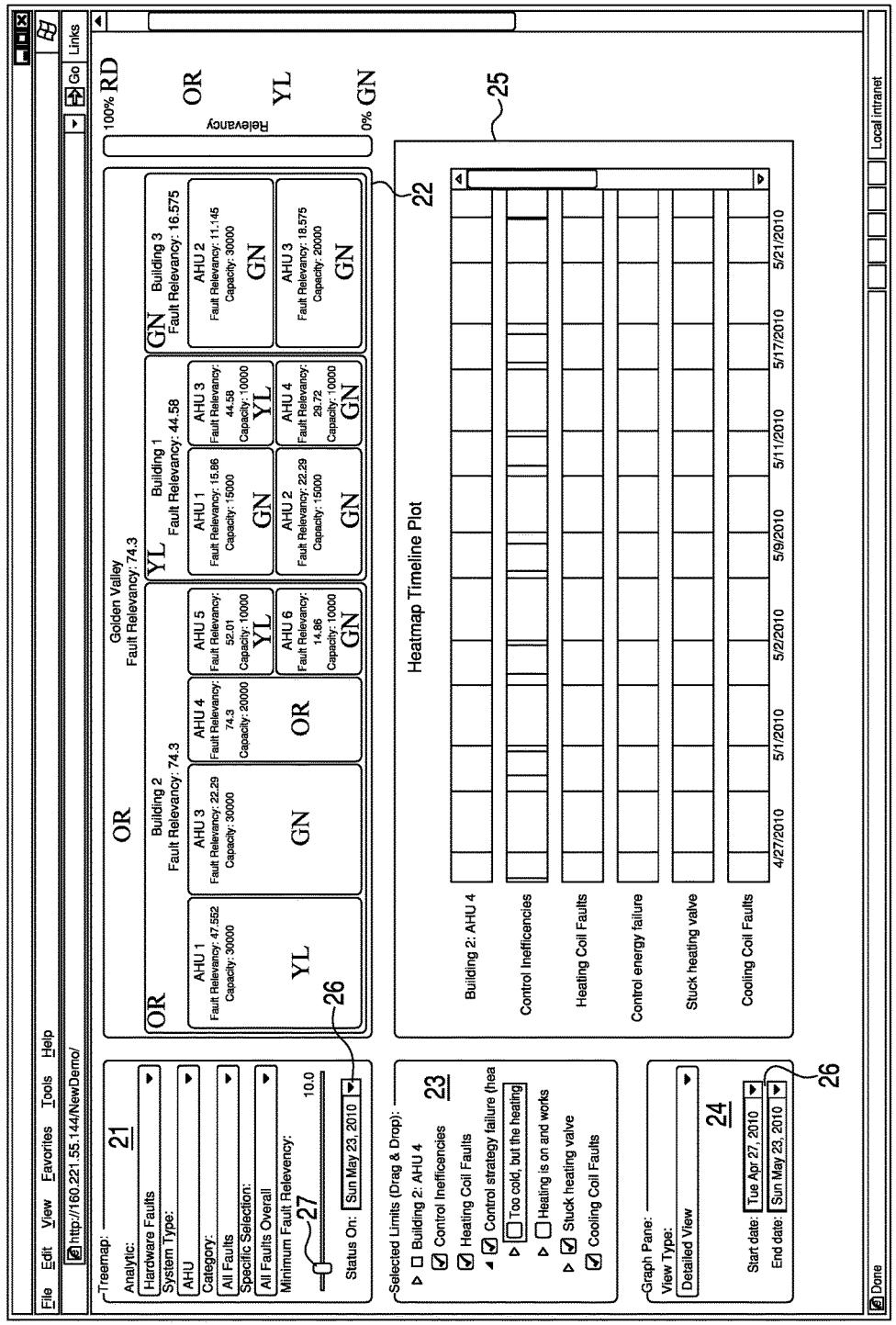
FIG. 5 is a diagram of a screen showing components of a navigation environment in a display.

FIG. 5 is a diagram of a screen showing the components of the navigation environment in a display screen. At the left of the diagram are controls for configuring the views and analytics. At the right may be two results of visualization areas which are a treemap (top) and a main graph pane (bottom).

A treemap filter 21 may provide for selection and configuring an analytic for controlling a display of a treemap 22. Treemap 22 may display HVAC equipment or building geometry hierarchically, and show summary data values. A selected units box 23 may be a container for units, components, zones, or the like, chosen for detailed analysis. Units in the context of box 23 may refer to components or items rather than measurement units. A graph pane selector 24 may provide for a selection of detailed, summary or combination views for items in selected units box 23. A graph pane 25 may reveal one or more graphs relating to a configuration and display of detailed analytic visualizations. A date/time control may be shown in boxes 26 of treemap filter 21 and graph pane selector 24. Date/time control may provide for date/time intervals for analysis. Date/time control may be split or shared between treemap 22 and the main graph pane 25 as appropriate.

Figure 6A:
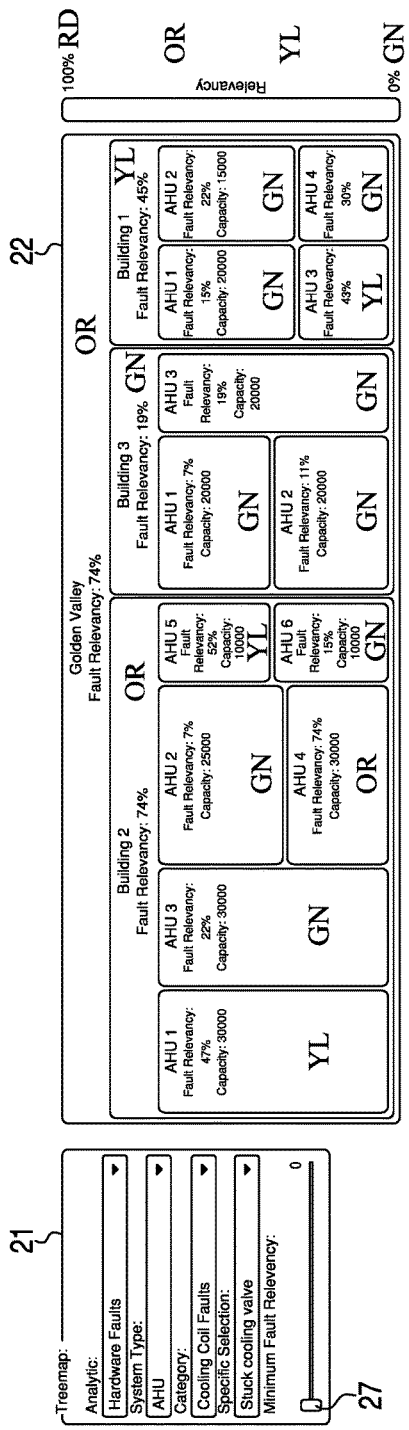
FIGS. 6a and 6b are diagrams illustrating results of a minimum fault relevancy filter applied to a treemap of items.
Figure 6B:
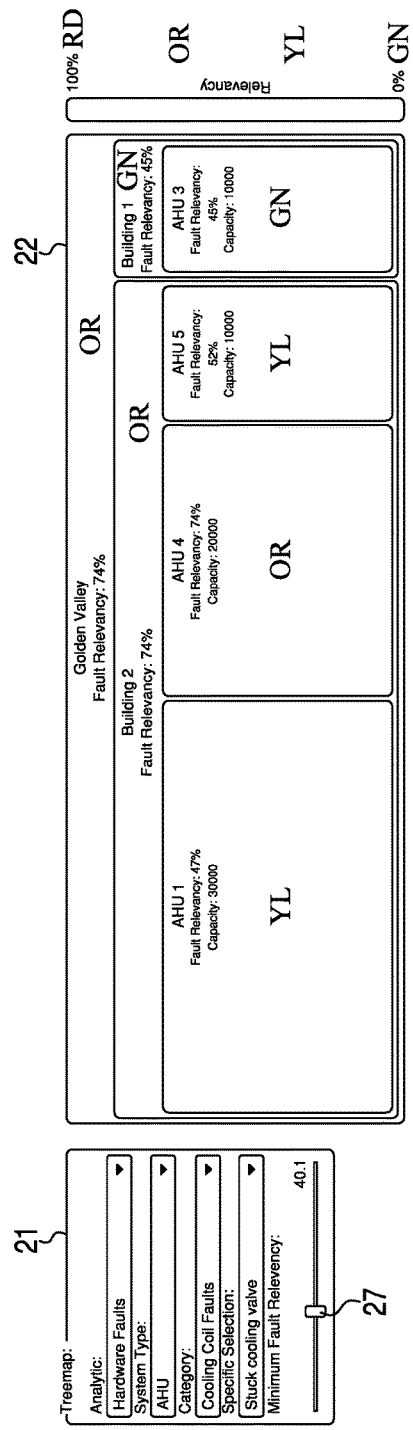

Treemap filter 21 may allow an analyst to choose the analytic and system type to be used for analysis. The choices made may determine both the treemap hierarchical structure and color code. Additional context-sensitive controls for filtering results may be presented as appropriate to each analytic. In an example of treemap filter 21, a slider bar 27 is available for filtering display of air handling units by minimum fault relevancy. With minimum fault relevancy set to zero, virtually all of the AHUs may be displayed in treemap 22 of FIG. 6a. Changing the minimum fault relevancy to 40.1, just those AHUs (and their containing buildings) having a fault relevance greater than 40 may be displayed, as shown in a diagram of FIG. 6b.

Figure 7A:
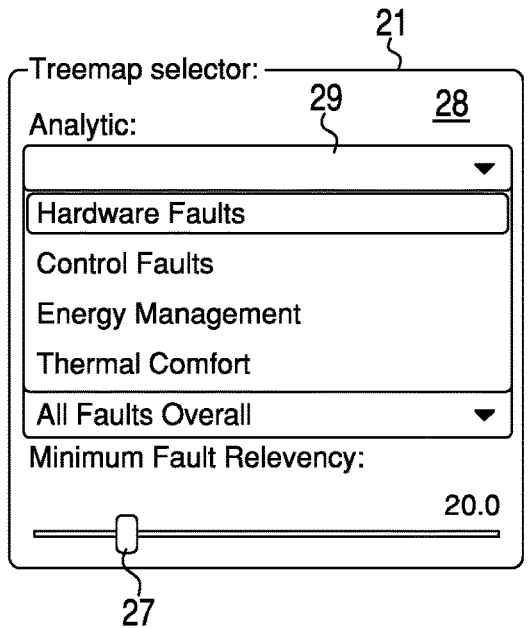
FIG. 7a is a diagram of a treemap filter with an analytic combo box for allowing a selection of an analytic.
Figure 7B:
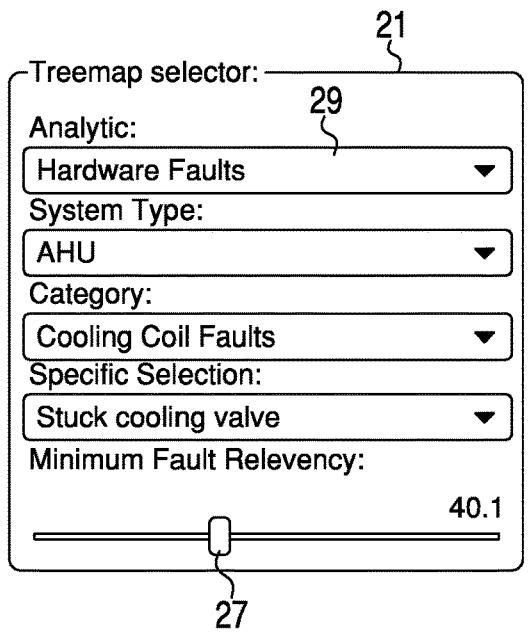
FIG. 7b is a diagram of the treemap showing a resulting display upon the selection of an analytic.

An analytic combo box 28 of treemap filter 21 may allow a selection of an analytic 29 in FIG. 7a. In FIG. 7b, with "Hardware Faults" as the selected analytic 29, and the user may have further control over "System Type", "Fault Category", and "Minimum Fault Relevancy".

Treemap 22 may display hierarchical data, with parent-child relationships expressed by containment within boxes. For energy analysts, different hierarchies are better suited for different analysis tasks.

Figure 8A:
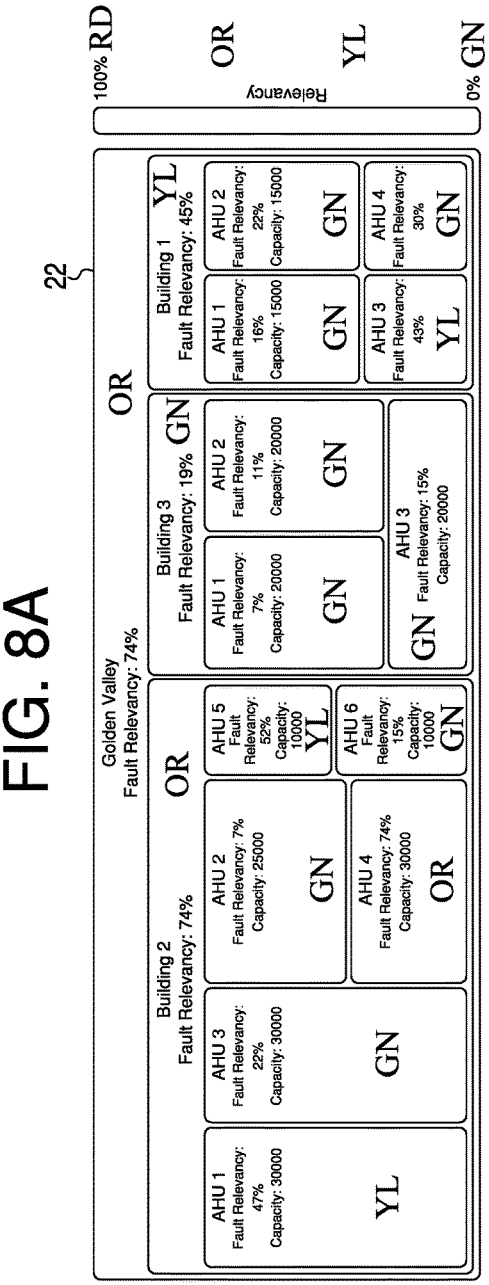
FIGS. 8a and 8b are diagrams of treemaps based on different hierarchies.
Figure 8B:
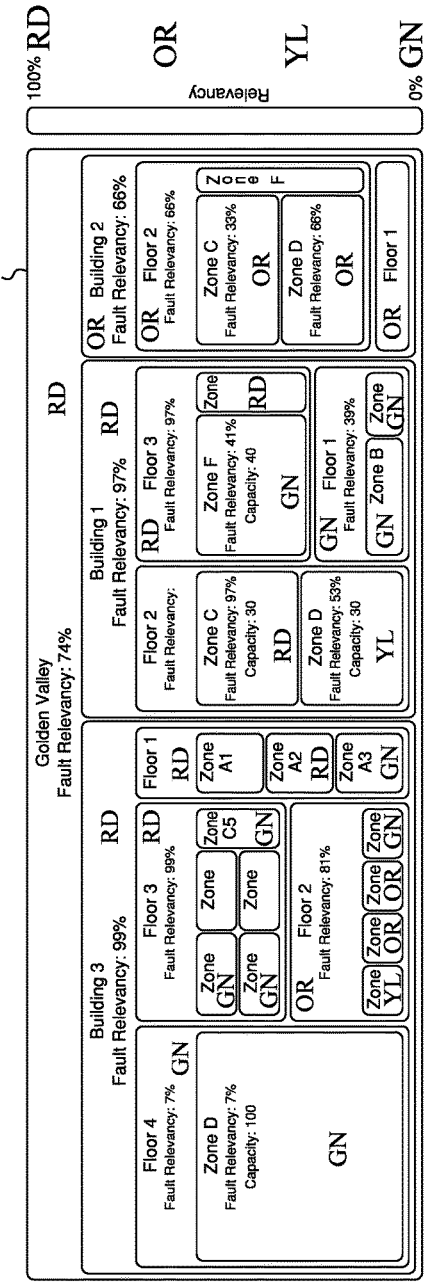

In FIGS. 8a and 8b are two examples of treemaps 22 based on different hierarchies. The diagram of treemap 22 in FIG. 8a may be based on an AHU HVAC system hierarchy. The diagram of treemap 22 in FIG. 8b may be based on a building geometry hierarchy.

Treemap 22 in the diagram of FIG. 8a may be structured according to AHU HVAC hierarchy. A site (e.g., Golden Valley) may be the top-level node, and AHU the bottom level. This may be a subset of the full Enterprise→Site→Building→AHU→VAV structure. Treemap 22 in the diagram of FIG. 8b may be structured according to building geometry hierarchy: Site (e.g., Golden Valley, Anywhere, U.S.A.) is the top-level node, and zone the bottom level. This may be a subset of the full Enterprise→Site→Building→Floor→Zone structure.

Figure 9:
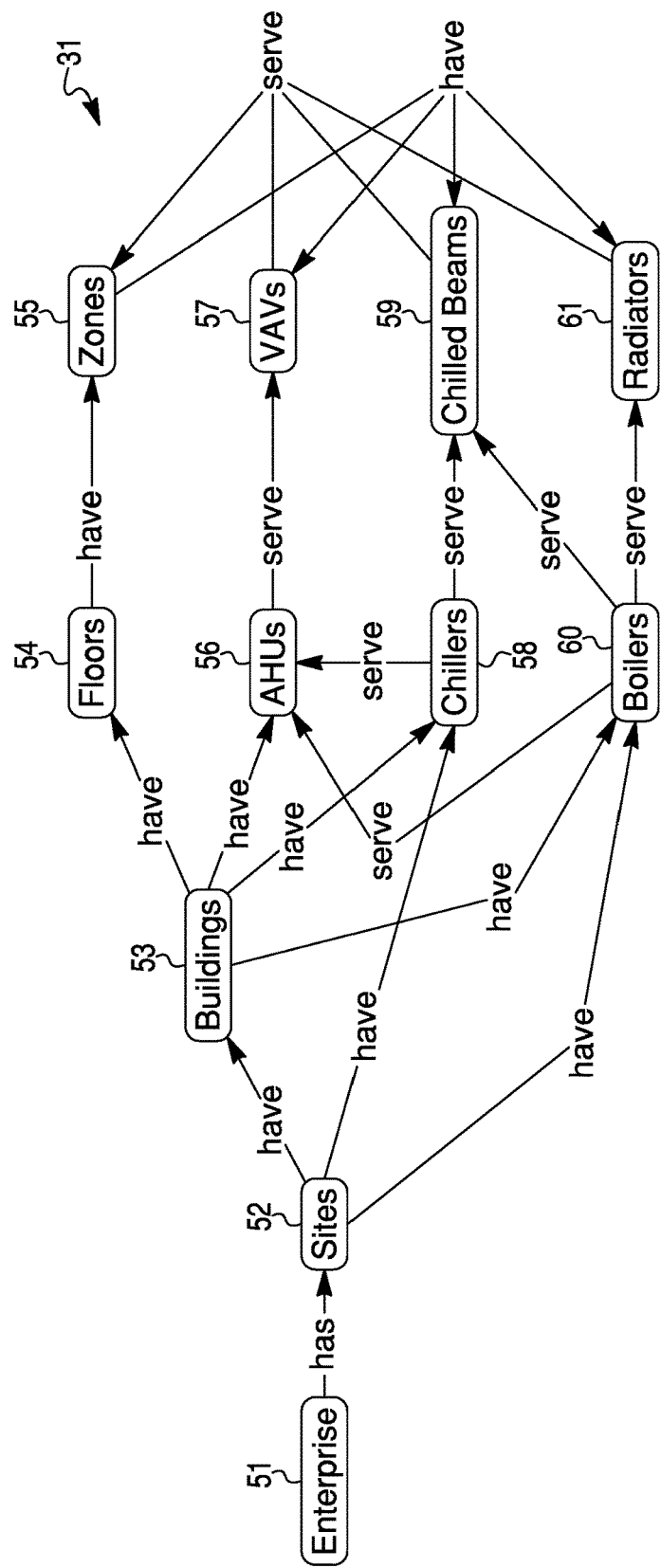
FIG. 9 is a diagram of a navigation web of treemap showing relationships among heating, ventilation and air conditioning equipment and building geometric components.

In FIG. 9, a diagram of a navigation web 31 of treemap 22 shows relationships among HVAC equipment and building geometric components. From web 31, hierarchies may be derived and used to structure treemap navigation for various analytics. The hierarchies, illustrated in the diagrams of FIGS. 10-13, may incorporate a building geometry hierarchy 32, an AHU HVAC hierarchy 33, a boiler HVAC hierarchy 34 and a chiller HVAC hierarchy 35, respectively.

Figure 10:
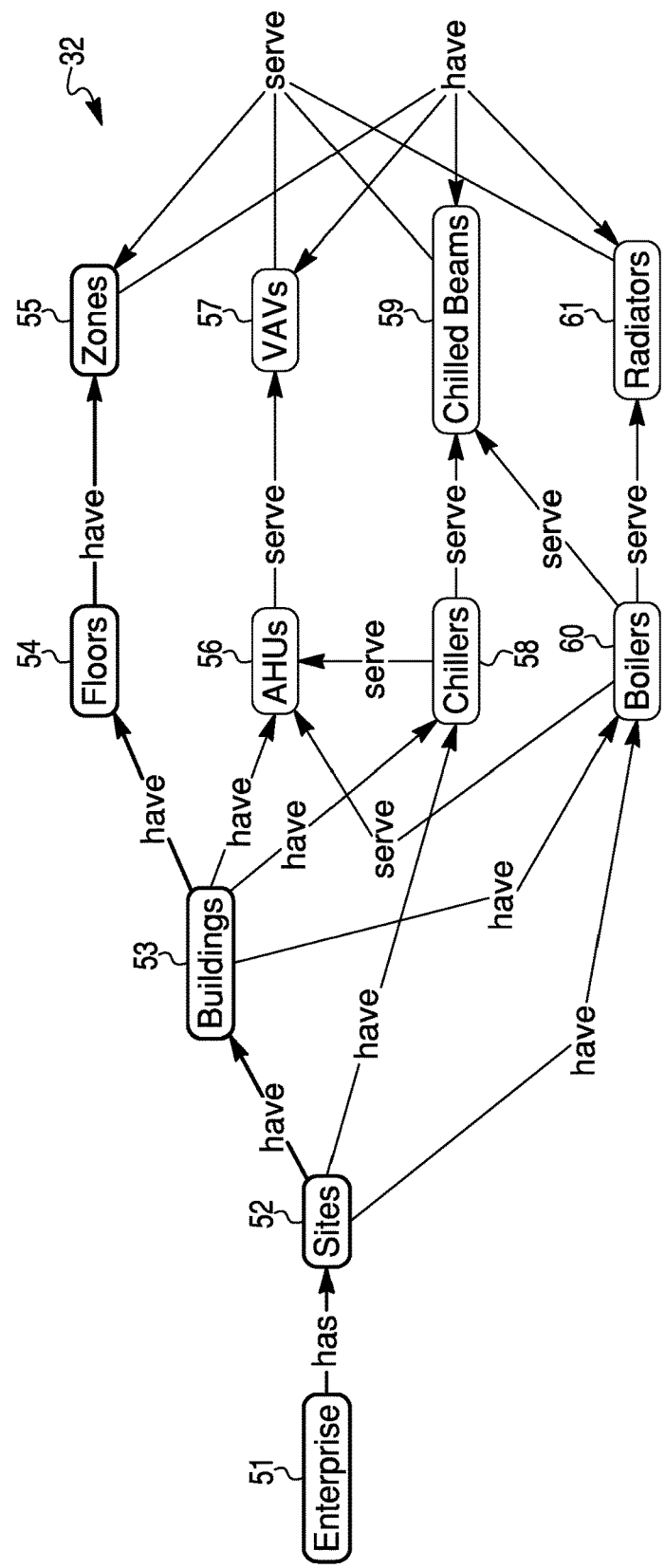
FIGS. 10-13 are diagrams of various hierarchies used to structure treemap navigation for various analytics.

Building geometry hierarchy 32 of treemap 22 in the diagram of FIG. 10 may be structured according to building geometric relationships. Beginning with the entire enterprise 51, it may divide buildings in an enterprise, into sites 52, individual buildings 53, floors 54 in each building 53, and zones 55 in each floor 54. Hierarchy 32 may be used to structure the treemap 22 for analytics where results pertain to a specific geometric area of a building 53, such as thermal comfort monitoring. Navigational connections to related HVAC systems may be defined along grey links, and could be accessed from the treemap via a right-click option. For example, right-clicking on a floor 54 or zone 55 in treemap 22 may bring up options such as "View linked chillers".

Figure 11:
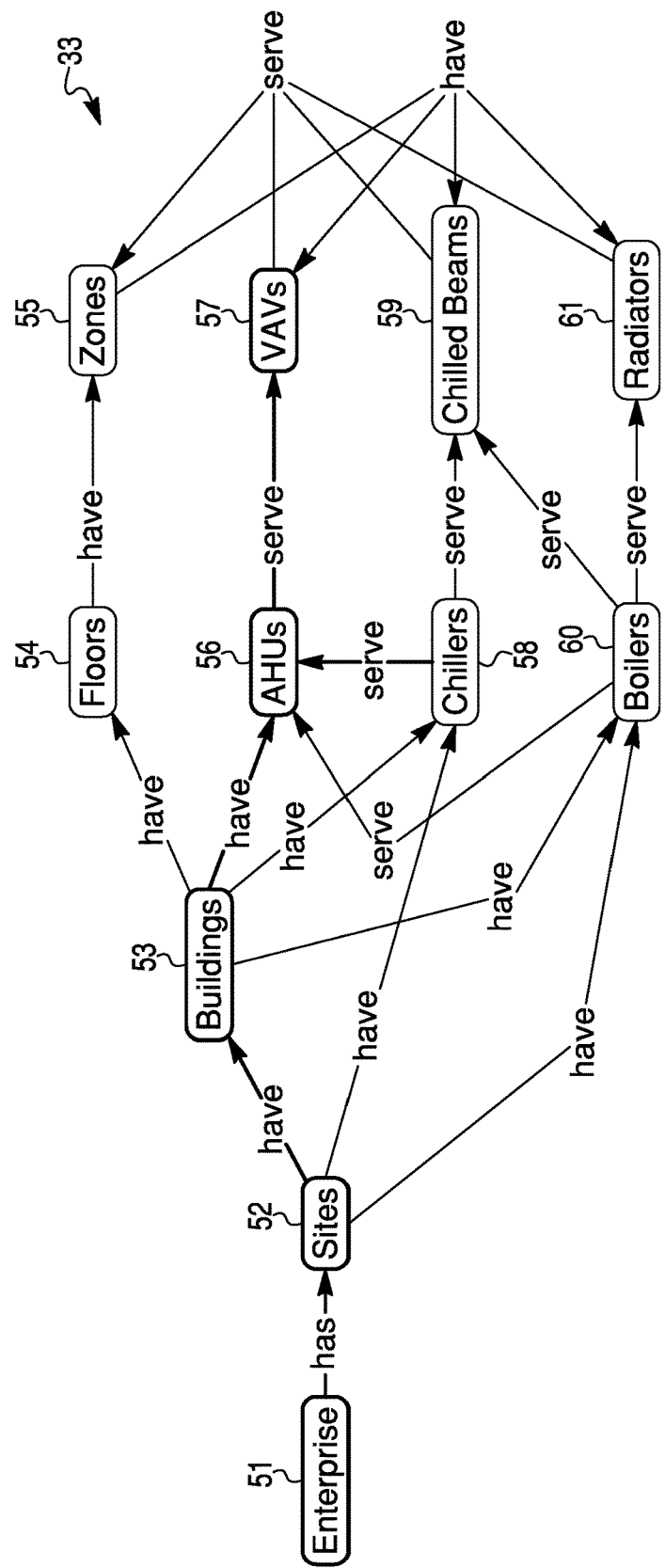

AHU HVAC hierarchy 33 of treemap 22 in the diagram of FIG. 11 may be structured according to relationships pertaining to air handling units (AHUs) 56. As AHUs 56 serve specific buildings 53, the enterprise 51, site 52, and building hierarchical levels may be shared with the building geometry hierarchy. However, below the building level, decomposition may be by an individual AHU 56 and then by variable air volume (VAV) units 57 served by air handlers. Hierarchy 33 may be used to structure treemap 22 for analytics pertaining to AHU performance, such as automated fault detection and diagnostics (AFDD) for AHUs 56, and control inefficiency monitoring. Connections to building geometry hierarchy 32 and to related HVAC systems such as chillers 58 and boilers 60 may be possible along grey links as described herein.

Figure 12:
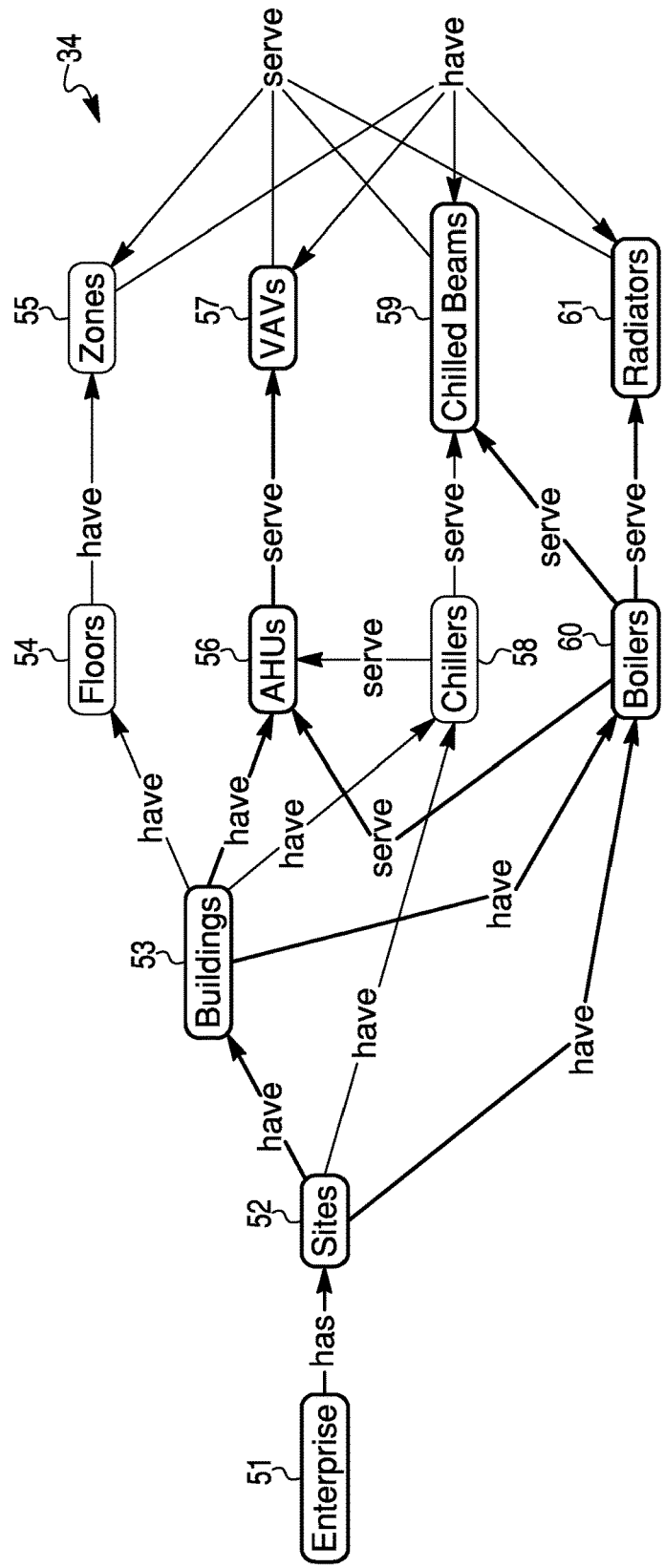

Boiler HVAC hierarchy 34 of treemap 22 in the diagram of FIG. 12 may be structured such that boilers 60 are the primary focus. Boilers 60 may serve either entire sites 52 or individual buildings 53 and therefore may be children of either. AHUs 56, chilled beams 59, and radiators 61 may be examples of boilers' children, as they are consumers of hot water. Hierarchy 34 may be used to structure treemap 22 for boiler-based analytics, such as AFDD for boilers 60. Connections to building geometry hierarchy 32 and to related HVAC systems such as chillers 58 may be possible along grey links described herein.

Figure 13:
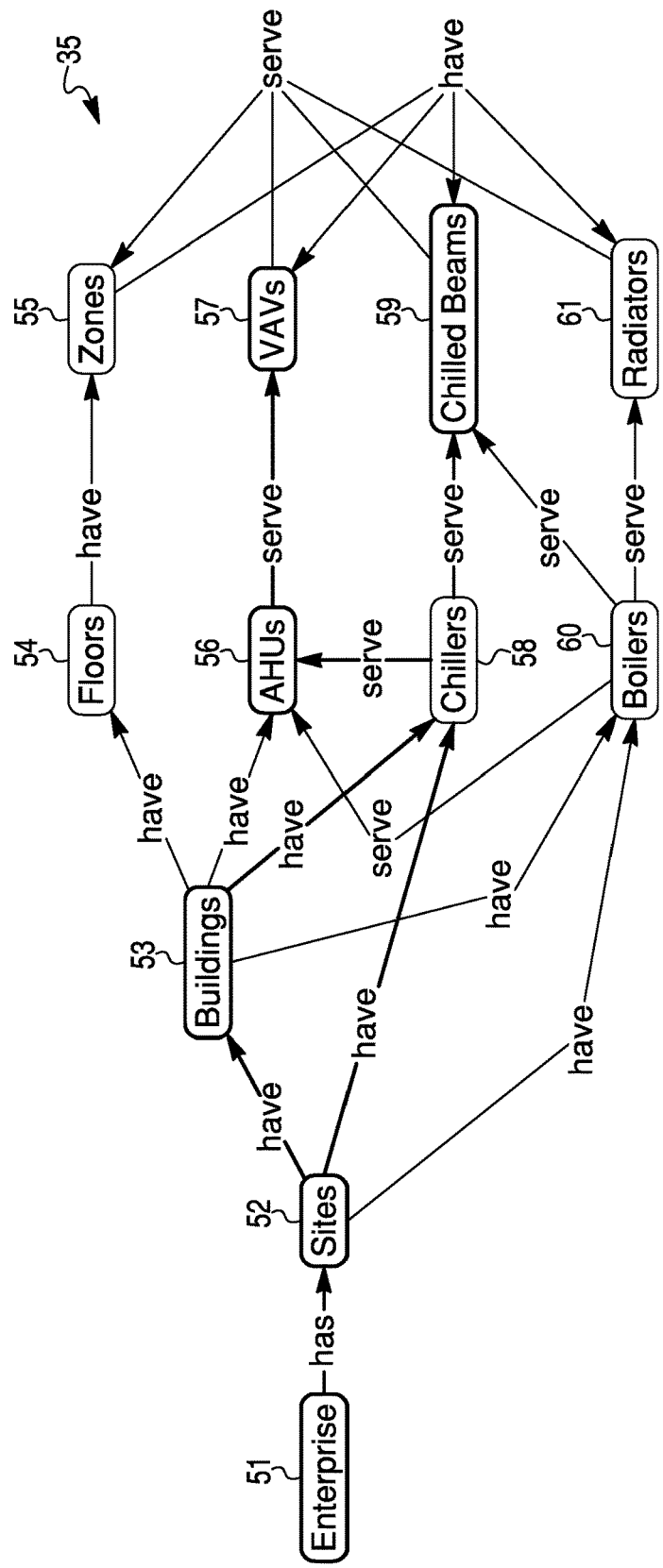

Chiller HVAC hierarchy 35 of treemap 22 in the diagram of FIG. 13 may be structured such that chillers 58 are the primary focus. Chillers 58 may serve either entire sites 52 or individual buildings 53 and therefore may be children of either. AHUs 56 and chilled beams 59 may be examples of children of chillers 58, as they may be consumers of chilled water. Hierarchy 35 may be used to structure the treemap 22 for chiller-based analytics, such as AFDD for chillers 58. Connections to building geometry hierarchy 32 and to related HVAC systems such as boilers 60 may be possible along grey links as described herein.

Figure 14:
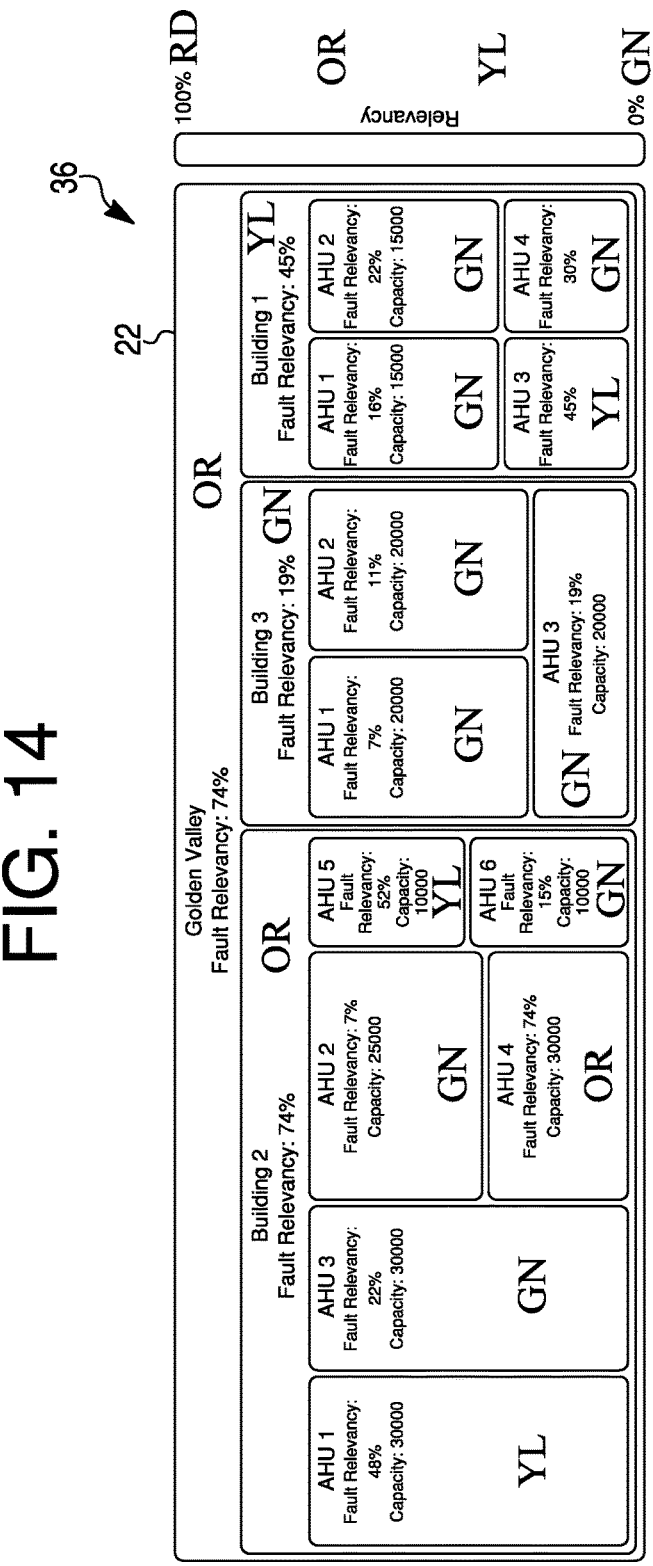
FIG. 14 is a diagram showing a treemap display of data and analytical results.

A diagram of FIG. 14 shows a treemap display 36 of data and analytical results. Whereas the treemap 22 structure may indicate hierarchical relationships, colors, box sizes, and labels indicate attributes, sensor values, or analytic results for each node. In the example in the diagram of FIG. 14, color, box size, and labels may be used as in the following. Color may present maximum fault relevancy for AHUs, buildings (collections of AHUs) and a site (collection of buildings). The fault relevancy may be indicated by a color gradient from green to red. Box size may represent a proportional capacity of each AHU, a sum capacity of AHUs in a building, and a sum capacity of AHUs in a site. Labels may be used to display the node description, and maximum fault relevance for each node. At each AHU node, AHU capacity may also be displayed. Labels may represent any underlying data about a specific system or zone, or a collection of systems or zones. Pop-up tooltips on graphs, displays, screens, and/or other like mechanisms, may also be used to present additional data.

Figure 15:
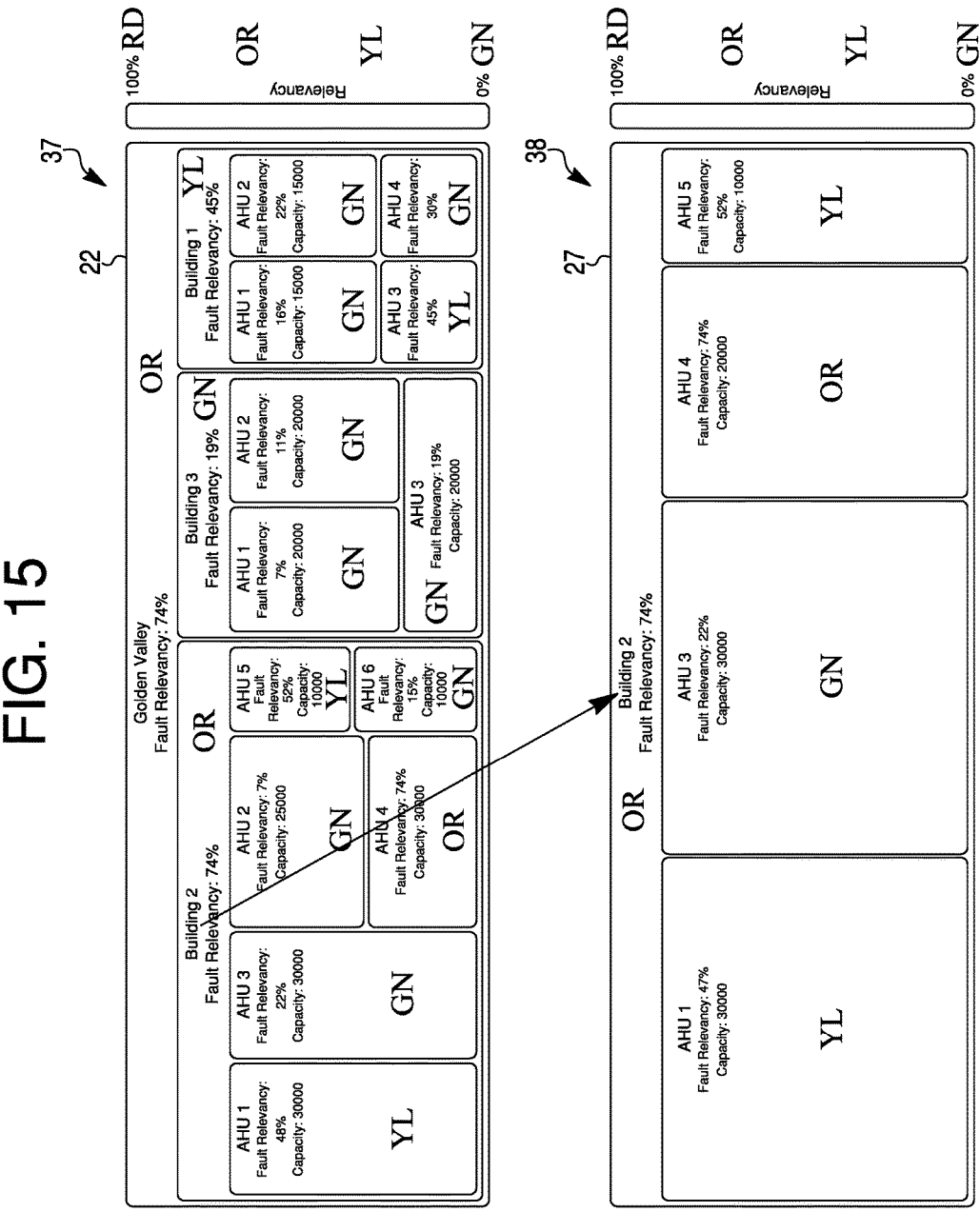
FIG. 15 is a diagram of a treemap based on a hierarchy of which clicking on an item in the treemap may bring the item to a top level of the hierarchy.

In addition to using the treemap filter to narrow down results, treemap 22 itself may also be used to "drill down" along a hierarchy. Double-clicking on a node in treemap 22 may move that node to the top level of the displayed hierarchy. FIG. 15 is a diagram of a treemap 22, based on the AHU HVAC hierarchy 33, double clicking, on Building 2 in the top screenshot 37 of treemap may bring it to the top level of the hierarchy (bottom screenshot 38). Double clicking again on Building 2 may result in a return from view 38 to the higher-level view 37.

Figure 16:
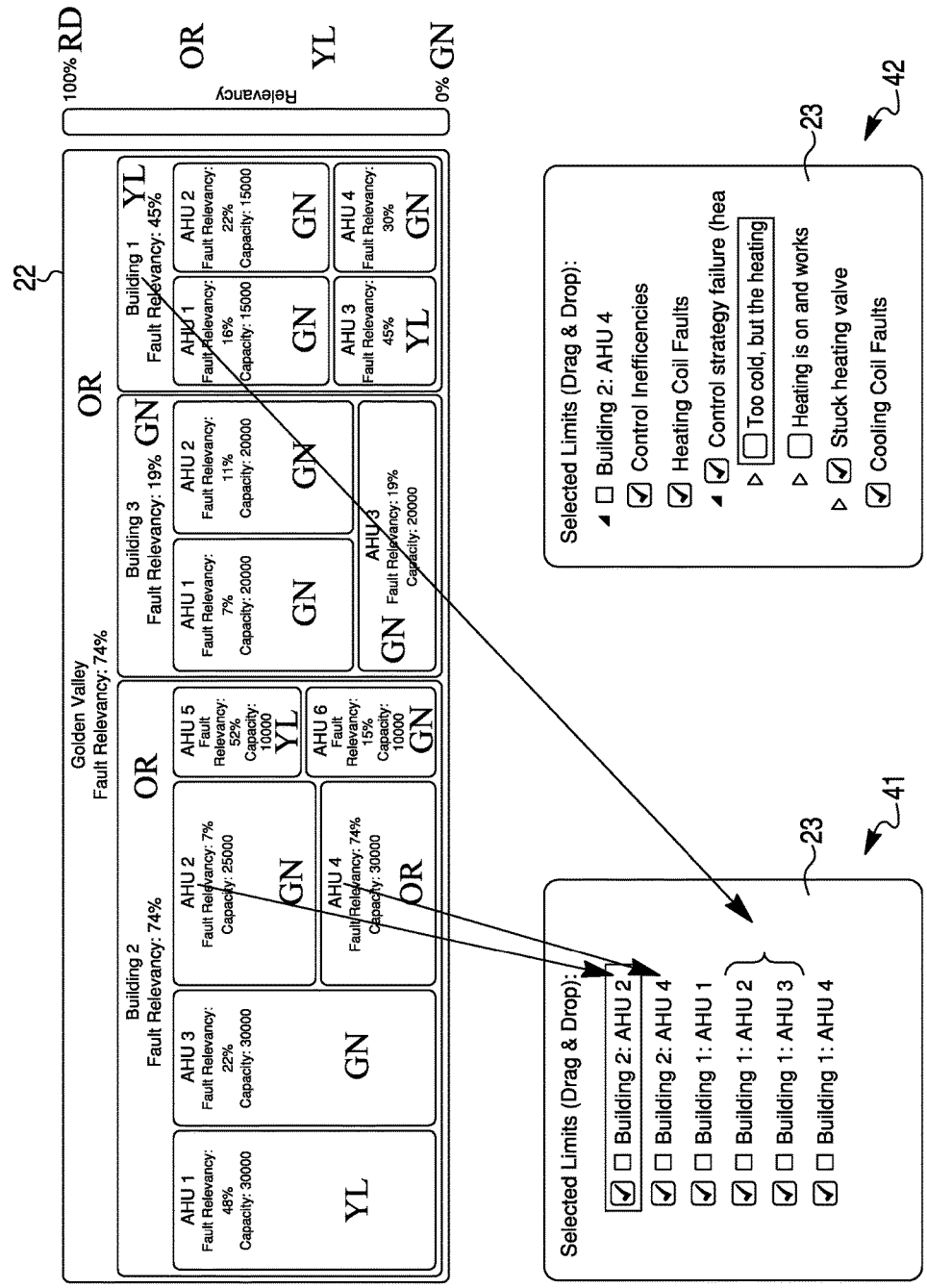
FIG. 16 is a diagram of a treemap and views of a selected units box for selection of entities and entity collections.

FIG. 16 is a diagram of treemap 22 and views 41 and 42 of selected units box 23 for selection of entities and entity collections. While treemap 22 may be used for limited data analysis, it may provide additional utility as a selection aid for entities to be compared in detail. Selection may be performed using the treemap 22 and selected units box 23. A user may drag any entity or collection of entities from treemap 22 to box 23. The entities currently active in the selected units box may then be displayed in graph pane 24. One may note that although six AHUs are shown in selected units box 23 at view 41 at the lower left of FIG. 16, just three actions might be required to add the units. Dragging Building 1 to selected units box 23 at view 41 may add virtually all AHUs within Building 1 to selected units box 23. Selected units box 23 may also allow an interactive configuration of the detailed view (heatmap timeline/trend plot) that is selected, allowing the user choice over which timelines are displayed. One may note graph pane 24 selector for additional information.

Selected units may be displayed in box 23 of view 41. Drill down is not necessarily available when a summary view is selected in the graph pane 24 selector. Selected units box 23 may allow drill down when a detailed view is selected in the graph pane 24 selector as indicated by view 42.

Figure 17:
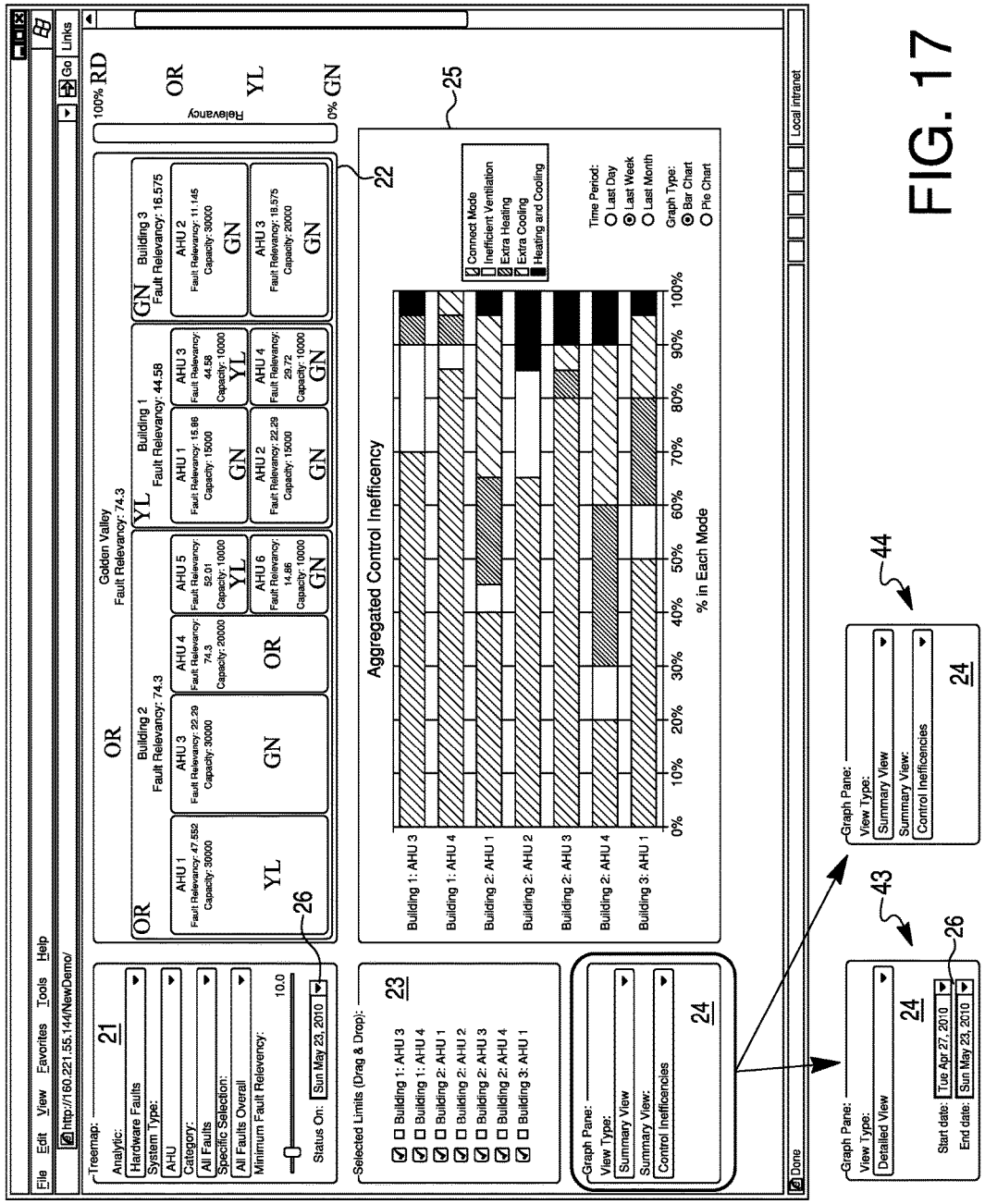
FIG. 17 is a diagram highlighting a graph pane selector to illustrate the selector's purpose and use.
Figure 18A:
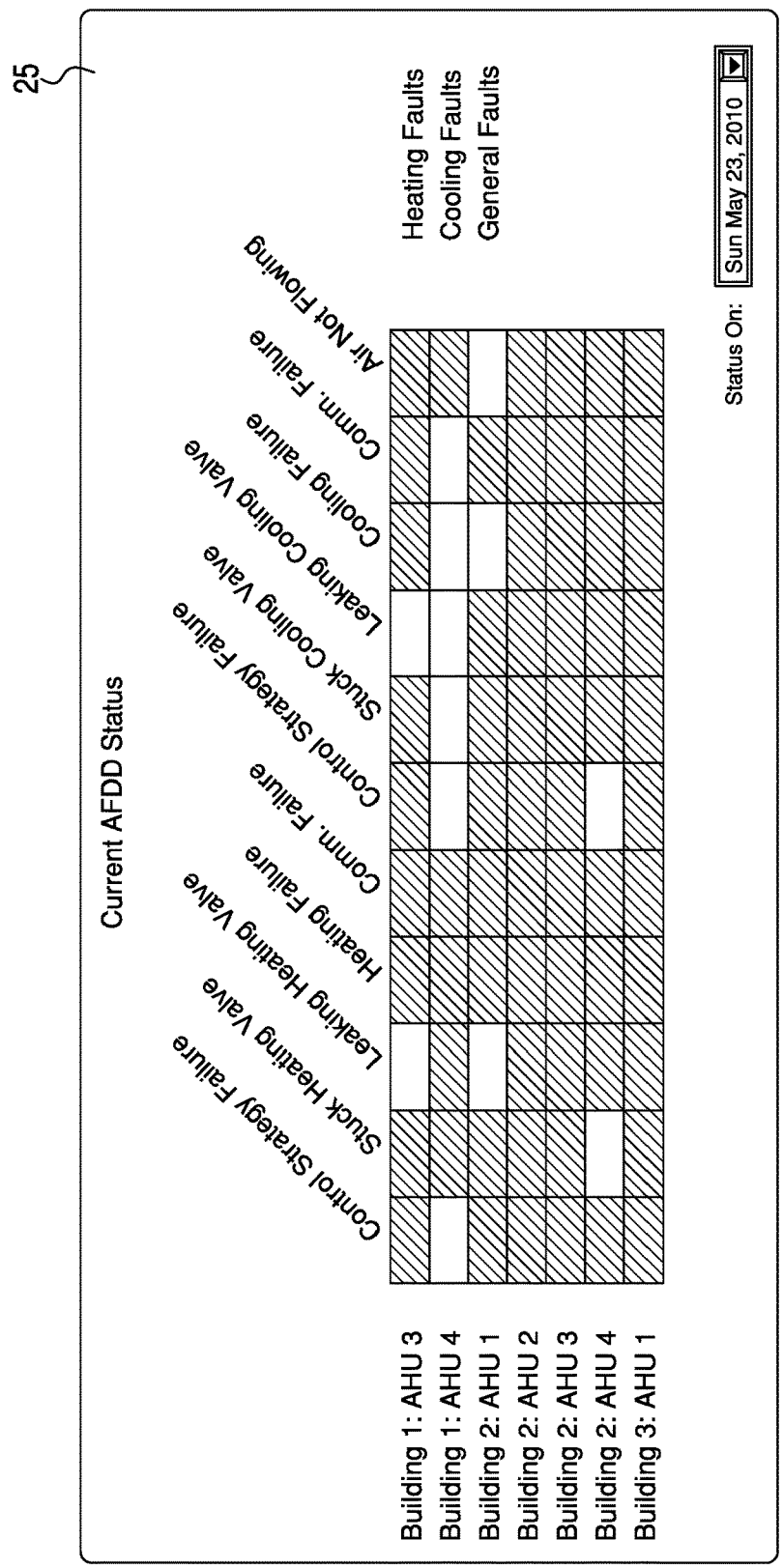
FIGS. 18a-18d are diagrams of visual examples of graph pane displays.
Figure 18B:
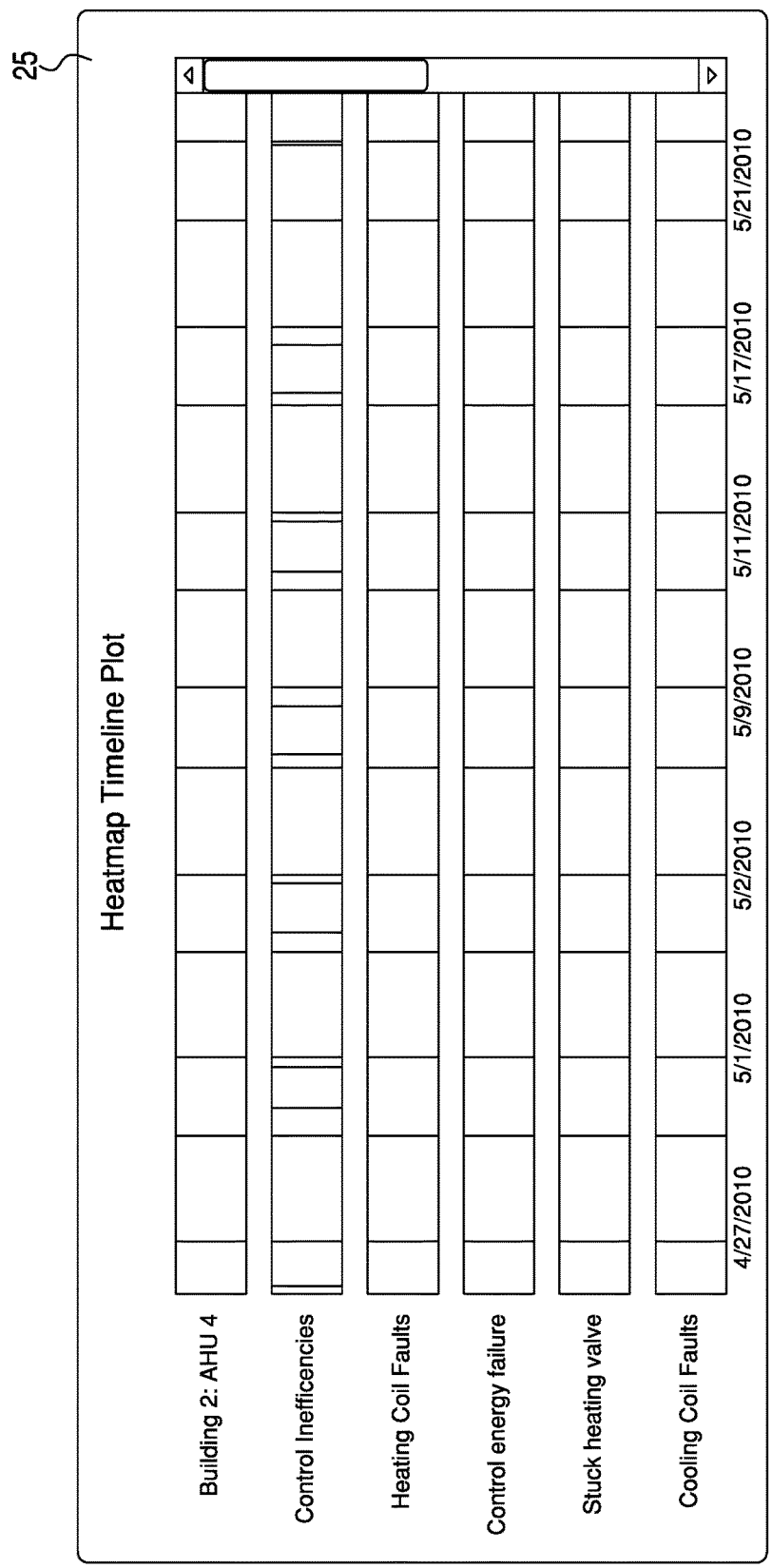
Figure 18C:
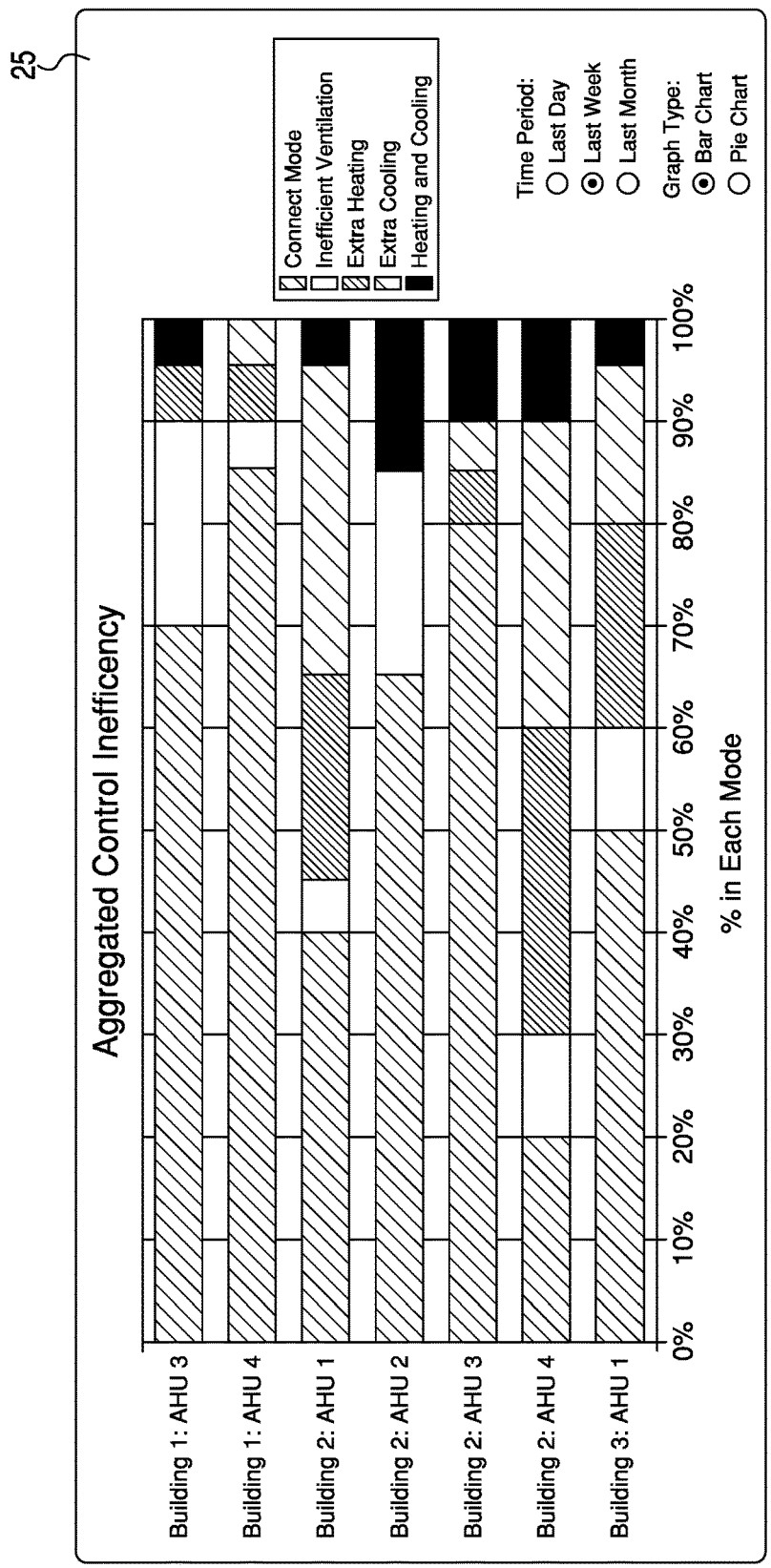
Figure 18D:
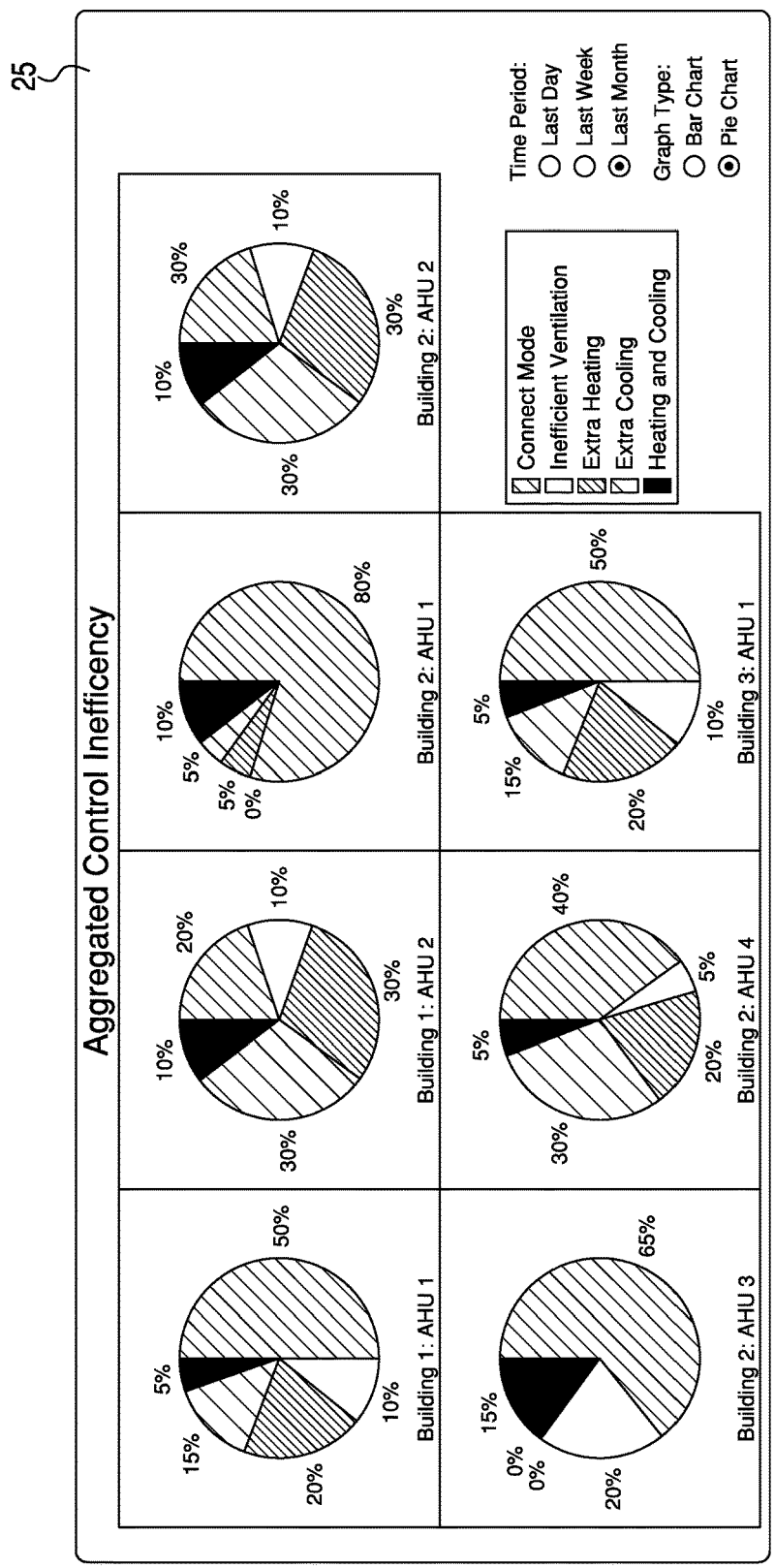

FIG. 17 is a diagram of a graph pane 24 selector indicating its concept and use. The graph pane selector may allow the analyst to select the graph displayed in the main graph pane 24. The top combo box, view type, may allow selection from detailed and summary views 43 and 44, respectively.

Selecting detailed view 43 may bring up a time selection control for the heatmap timeline plot. Selecting detailed view 43 from the view type combo box may show an interactive heatmap timeline/trend plot. Selected units box 23 may allow interactive selection of timelines for display, and time control is available in the graph pane 24 selector.

Selecting summary view 44 may bring up a combo box to select from various summary view graphs. Selecting summary view 44 from the view type combo box may allow selection of charts such as control inefficiencies, fault status summary, and energy profiles. Visual examples of graph pane displays are shown in diagrams of FIGS. 18a-18d. Graph pane 25 may be a primary area for display of detailed data views or analytic results. A generated graph may be created based on the units active in the selected units box 23 and the parameters selected in the graph pane 24 selector. Graphs may consist of pie charts, line (trend) plots, heatmap timelines or other advanced visualizations.

Figure 19:
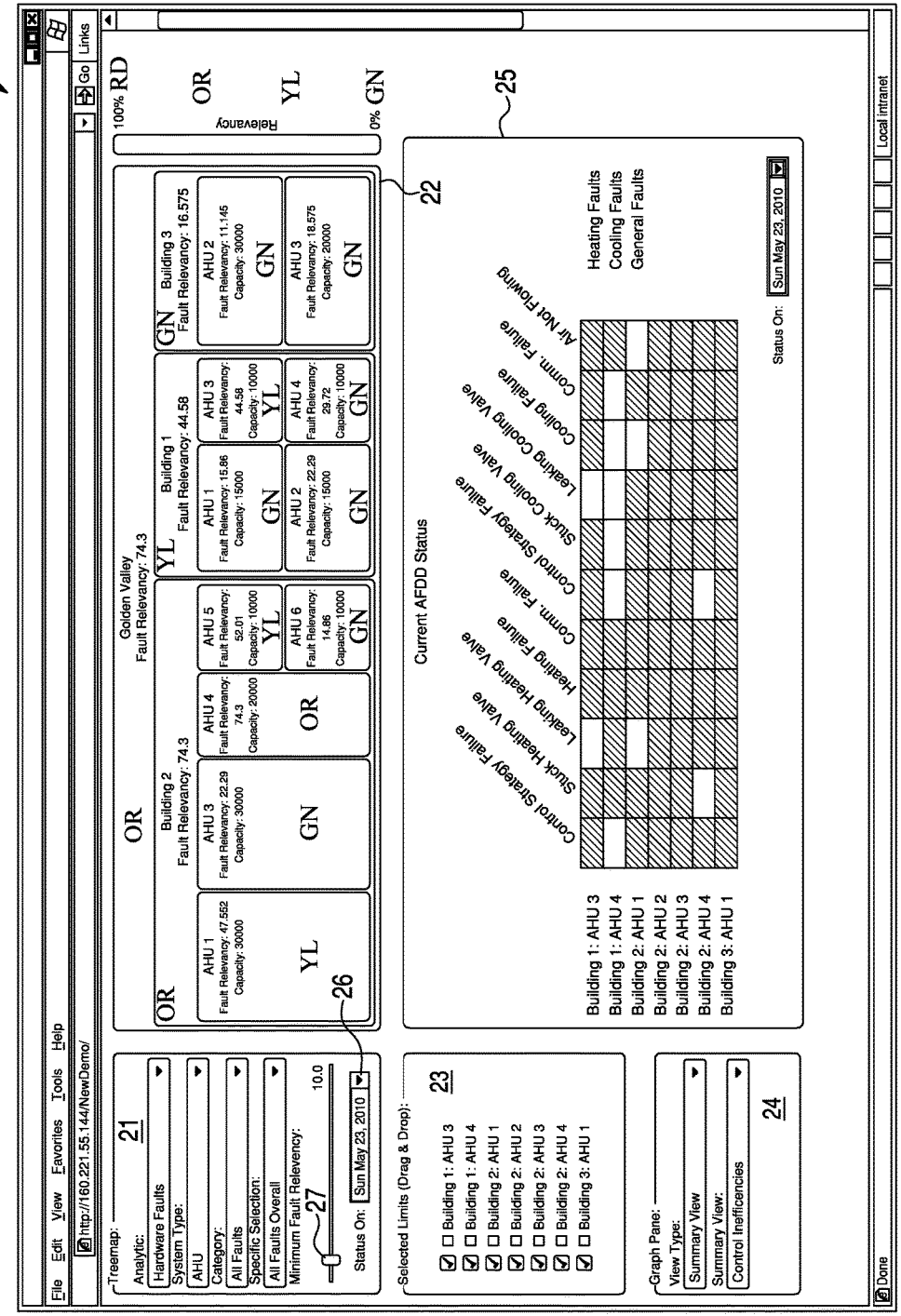
FIG. 19 is a diagram of a resulting matrix table of a graph pane selector according to a particular analytic such as automated fault detection and diagnostics relative to a selected unit in a selected units pane.
Figure 20:
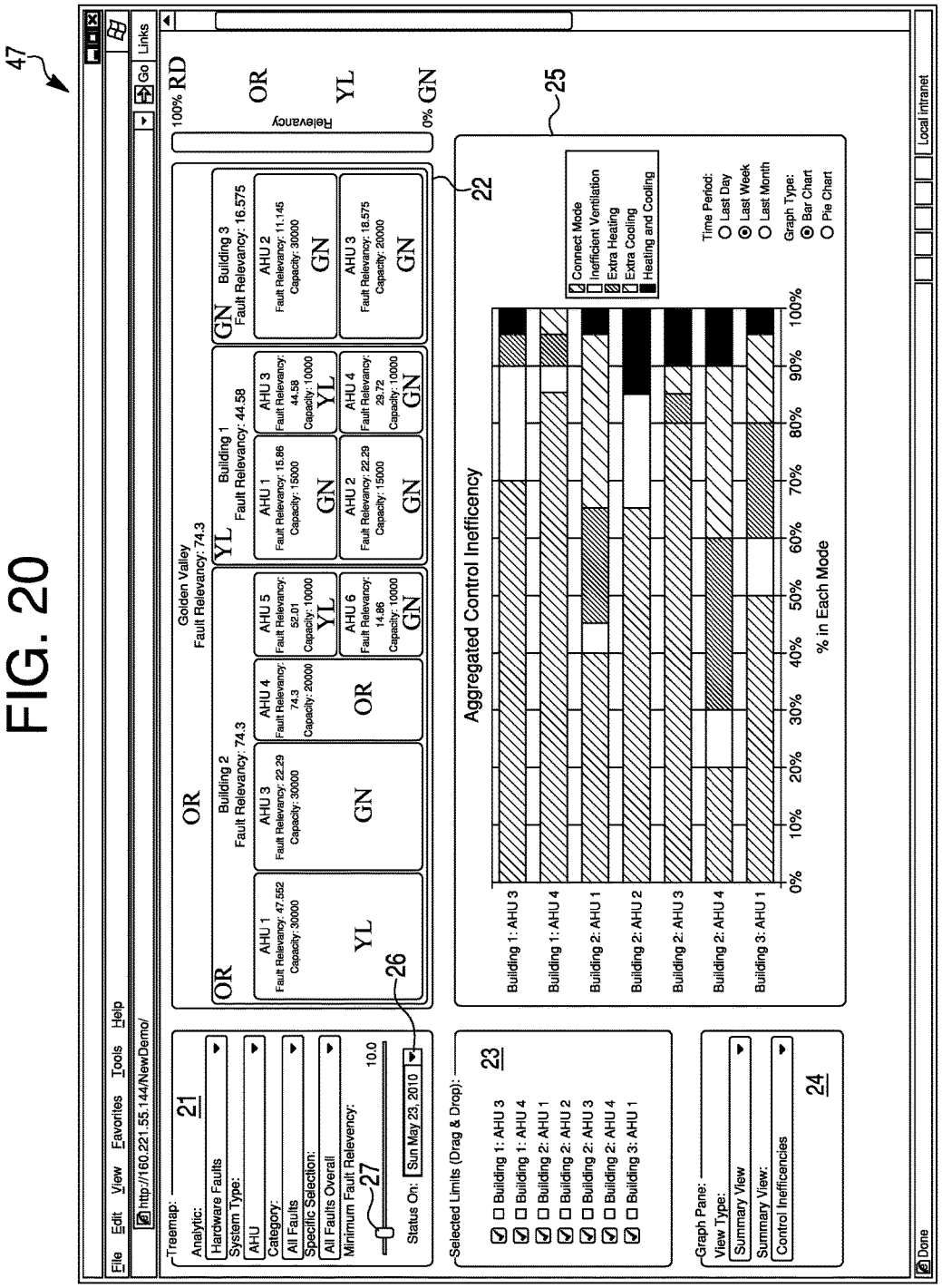
FIG. 20 is a diagram of a resulting bar graph of the graph pane selector according to a particular analytic pertaining to aggregate control inefficiency relative to a selected unit in a selected units pane.
Figure 21:
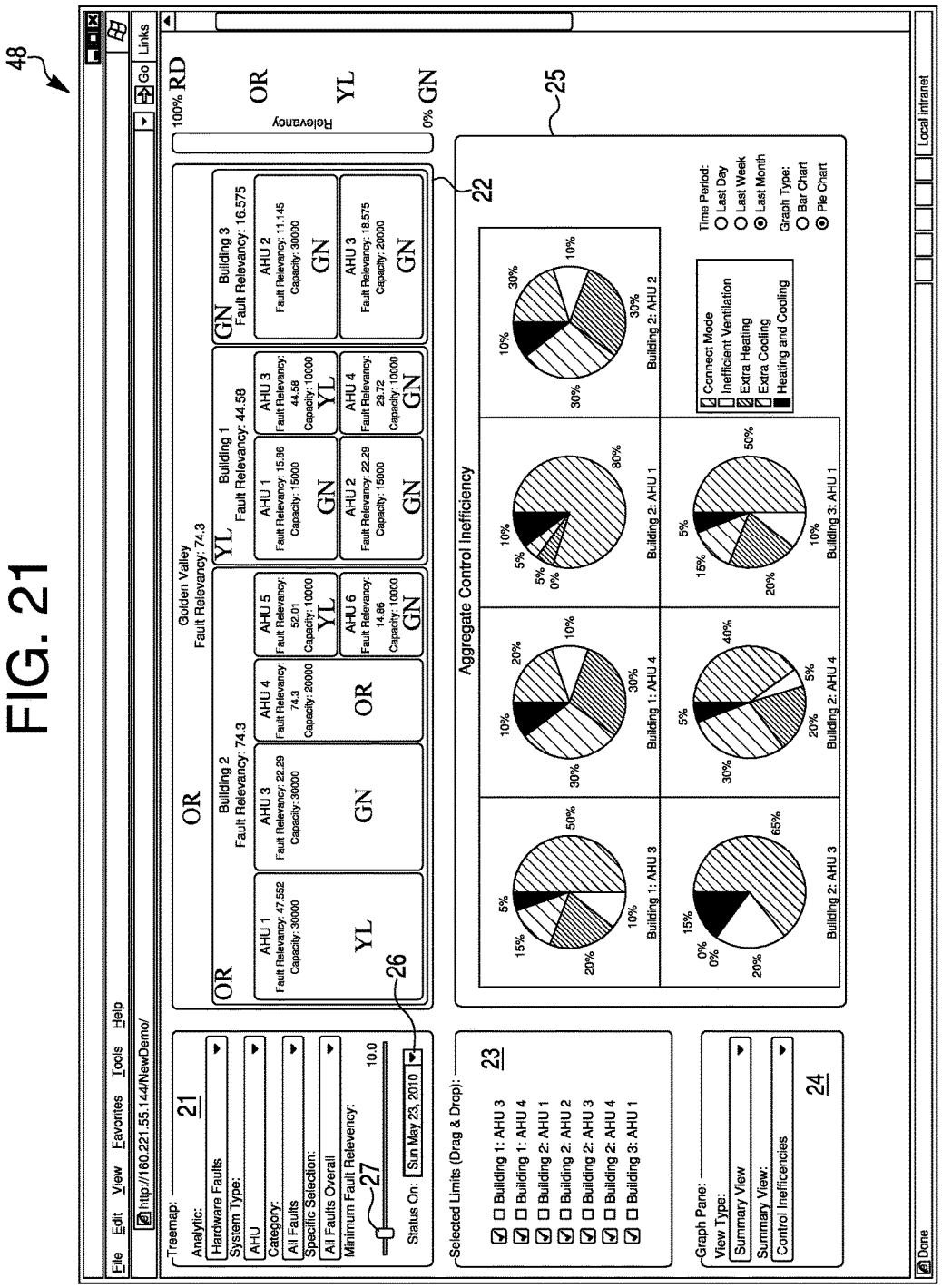
FIG. 21 is a diagram of resulting pie graphs of the graph pane selector according to the particular analytic pertaining to aggregate control inefficiency relative to a selected unit in a selected units pane.
Figure 22:
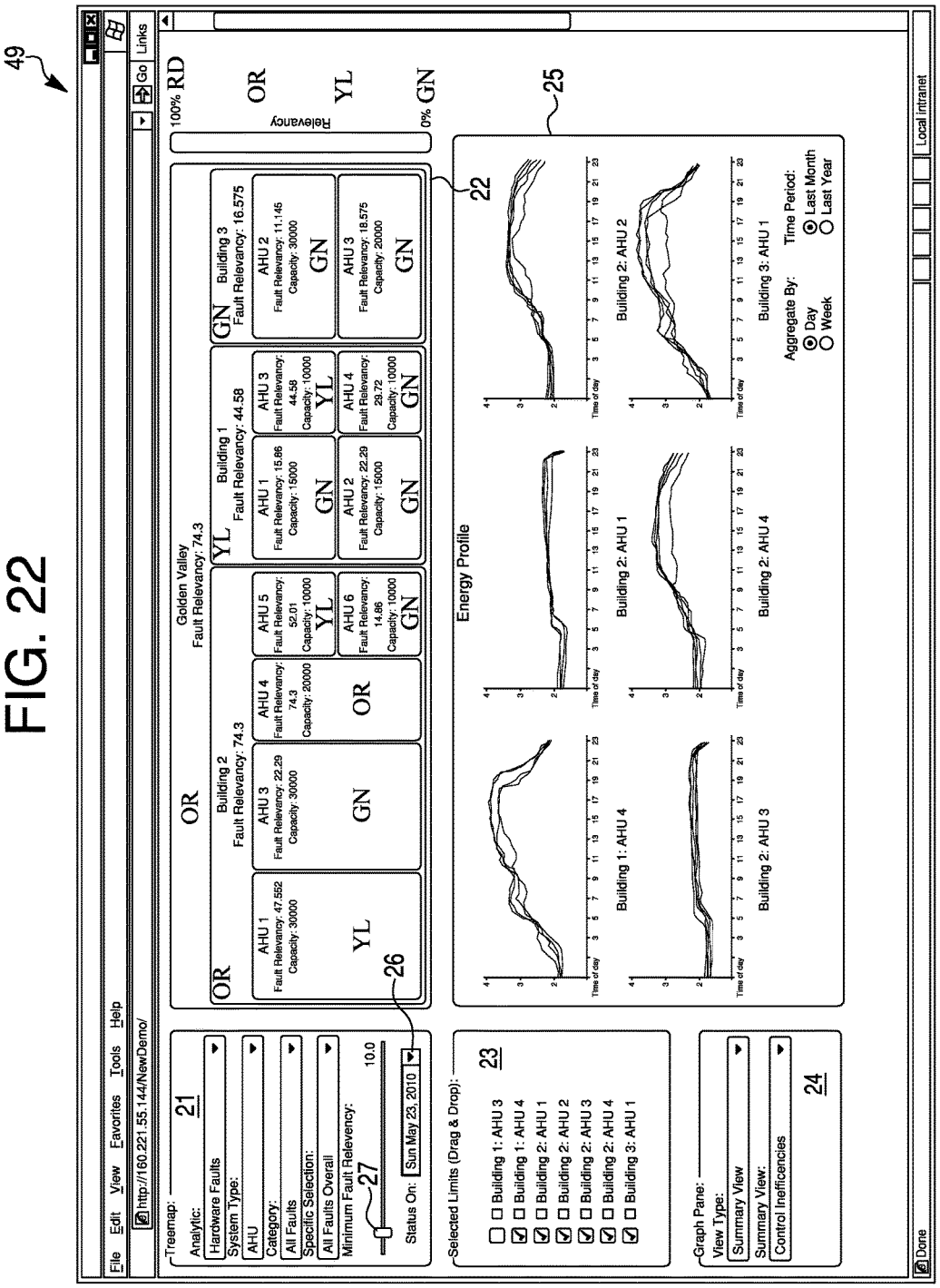
FIG. 22 is a diagram of resulting curve graphs of the graph pane selector filter according to a particular analytic pertaining to energy profiles relative to a selected unit in a selected units pane.

Some off-line visualization types, for various raw data and analytic engine results, which may influence a development of graph pane plots may be shown with display examples in the navigation environment as in the following. FIG. 19 is a diagram of an example view 46 of AFDD for an AHU summary view. An example of a detail heatmap timeline is shown in the diagram of FIG. 5. FIG. 20 is a diagram of view 47 of an example control inefficiency bar graph. An example of control inefficiency pie charts is shown in a view 48 of a diagram in FIG. 21. An example of continuous commissioning (CCx) energy profiles is shown in a view 49 of a diagram in FIG. 22.

To recap, an interactive navigation environment system may incorporate a data warehouse, a processor connected to the data warehouse, heating, ventilation and air conditioning (HVAC) equipment sensors connected to the data warehouse, and a visualization tool connected to the processor and the data warehouse. The visualization tool may further incorporate a treemap and a graph pane.

The treemap may be a visualization of a hierarchical structure comprising items representing building geometry and HVAC equipment. The graph pane may provide one or more presentations of analysis pertaining to one or more items selected from the treemap.

The visualization tool may further incorporate a treemap filter, a selected units box, and a graph pane selector. The treemap filter may permit selection of an analytic and/or system type for determining which items are to be displayed in the treemap. The selected units box may be a container for items chosen for analysis. A graph pane selector may provide for selection of various presentations in the graph pane of the analysis of items in the selected units box.

The visualization tool may further incorporate a date and time control mechanism for selection of data/time intervals for presentations of an analysis of the items. The treemap may display an organizational structure of the items according to one or more hierarchies. The hierarchies may incorporate a building geometry hierarchy and an HVAC equipment hierarchy. The HVAC equipment hierarchy may be an HVAC connectivity model.

The information about the organizational structure may be presented in the graph pane as a summary view, a detail view, or a combination of the summary and detail views. The summary view, the detail view, or the combination of the summary and detail views may be selected from a group consisting of bar charts, heatmap timeline plots, pie charts, listings and profiles.

Clicking on an item on the treemap may result in a drill down to move a clicked-on item to a top level of a displayed hierarchy. Items of the organizational structure of the treemap may indicate a fault relevancy of the respective items in the treemap.

A treemap having the organizational structure according to the building geometry hierarchy, may incorporate a first level showing a viewed enterprise, a second level showing individual sites, and a third level showing building structures within the sites. A fourth level showing floors of the building structures may be achieved by a drill down on the treemap for more detail. A fifth level showing zones to the floors may be achieved by a drill down. Existing sixth and further levels beyond a preceding level showing more detail may be achieved by a drill down.

The building geometry hierarchy and the HVAC equipment hierarchy may be interconnected. Clicking on a floor in an organizational structure of the treemap and selecting show-linked HVAC equipment items, may provide information of the HVAC equipment items on the floor. Upon clicking on the floor, the floor may become a first level of the organizational structure of the treemap. HVAC equipment items that serve the floor may be children of the floor. Other HVAC equipment items linked to the HVAC equipment items that serve the floor may be children of the HVAC equipment items.

Fault relevancy of an item may be indicated in the treemap. Items in the treemap having fault relevancy of X or greater may be selected by a treemap filter set to a minimum fault relevancy of X percent. X may range from zero to 100. X of an item at a particular moment may be determined by a number of faults that occur relative to the item during a fixed period of time up to the particular moment.

An approach for navigating an interactive environment having a visualization of heating, ventilation and air conditioning (HVAC) performance within an enterprise, may incorporate providing a treemap having a hierarchal structure of an enterprise comprising units, providing a graph pane, providing a selected units box, providing a treemap filter, providing a graph pane selector, using the treemap filter to choose an analytic and/or system type to determine the hierarchal structure and/or color code of symbols representing the units of the hierarchal structure, choosing units for analysis and placing the units in the selected units box, and/or using the graph pane selector to choose detailed or summary views of results from an analysis of the units in the selected units box. One or more actions of the present approach may be performed by a computer.

The treemap may be placed in a first visualization area of a display. The graph pane may be placed in a second visualization area of the display. The approach may further incorporate providing a mechanism for a selection of date/time intervals for the analysis of units, and placing the treemap filter and the graph pane selector on an area of the display.

Relative to the approach, units of the treemap may be filtered according to a minimum fault relevancy setpoint between zero and 100 percent. The minimum fault relevancy setpoint may be adjusted on the display. Units having a fault relevancy greater than the fault relevancy setpoint may be displayed in the treemap. A fault relevancy of a unit may be determined by a number of faults that occur relative to the unit over a given period of time.

A system having an interactive navigation environment for building energy performance visualization, may incorporate a treemap filter, a treemap having a configuration determined at least in part according to the treemap filter, a selected units box having a collection of entities comprising buildings, components, zones or the like of the treemap, chosen for analysis, graph pane selector, and a graph pane.

The graph pane may display results of analysis of entities in the collection of entities in one or more formats selected from a group of formats consisting of bar graphs, pie charts, line trend plots, heatmap timelines and other formats. The analysis may be provided by a processor.

The treemap may reveal an enterprise of entities hierarchically in geometrical symbols on a display. Each of the symbols may indicate one or more summary data values for an entity represented by the respective symbol. Summary data values may incorporate an attribute, property and/or fault relevancy of the entity. A size of a symbol may indicate an attribute, property, and/or fault relevancy of the entity represented by the symbol. A color of a symbol may indicate an attribute, property, and/or fault relevancy of the entity represented by the symbol. A symbol representing an entity may contain one or more symbols representing entities within the entity.

One or more symbols, representing one or more entities, respectively, may be dragged from the treemap to the selected units box on the display. One or more symbols within a symbol being dragged, may also be dragged along with the symbol to the selected units box.

Information about entities represented by the symbols, including entities represented by symbols within a symbol, in the selected units box may be displayed on the graph pane.

A clicking on a symbol representing a first entity may result in a drill-down to one or more symbols within the symbol representing one or more entities within the first entity. Fault relevancy of an entity may be indicated by a number of faults occurring over a certain period of time up to a moment at which the fault relevancy is to be determined.

The present application may be related to U.S. patent application Ser. No. 12/259,959, filed Oct. 28, 2008, and entitled "Apparatus and Method for Displaying Energy-Related Information"; U.S. patent application Ser. No. 13/015,545, filed Jan. 27, 2011, and entitled "An Energy-Related Information Presentation System"; U.S. patent application Ser. No. 13/086,255, filed Apr. 13, 2011, and entitled "A Heatmap Timeline for Visualization of Time Series Data"; and U.S. patent application Ser. No. 13/220,895, filed Aug. 30, 2011, and entitled "An Energy Dashboard".

U.S. patent application Ser. No. 12/259,959, filed Oct. 28, 2008, and entitled "Apparatus and Method for Displaying Energy-Related Information", is hereby incorporated by reference. U.S. patent application Ser. No. 13/015,545, filed Jan. 27, 2011, and entitled "An Energy-Related Information Presentation System", is hereby incorporated by reference. U.S. patent application Ser. No. 13/086,255, filed Apr. 13, 2011, and entitled "A Heatmap Timeline for Visualization of Time Series Data", is hereby incorporated by reference. U.S. patent application Ser. No. 13/220,895, filed Aug. 30, 2011, and entitled "An Energy Dashboard", is hereby incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system having an interactive navigation environment for building performance visualization, comprising:
   a processor;
   a display connected to the processor;
   heating, ventilation and air conditioning (HVAC) equipment having sensors connected to the processor; and
   a visualization tool for monitoring building performance connected to the processor; and
   wherein the visualization tool is configured to present and filter building energy performance in response to a user selected analytic.

2. The system of claim 1, wherein the user selected analytic is automated fault detection and diagnostics.

3. The system of claim 1, wherein the user selected analytic is control inefficiency.

4. The system of claim 1, wherein the user selected analytic is energy consumption.

5. The system of claim 1, wherein in the selected analytic causes the processor to display one or more menus and/or filters related to the selected analytic.

6. The system of claim 1, wherein the visualization tool comprise a treemap and a graph pane.

7. The system of claim 6, wherein the treemap is a visualization of a hierarchical structure comprising items representing building geometry and HVAC equipment.

8. The system of claim 7, wherein the graph pane is configured to display data or analytic results related to one or more items selected from the treemap.

9. The system of claim 8, wherein the data or analytic results are presented as a summary view, a detail view, or a combination of the summary and detail views.

10. The system of claim 9, wherein the summary view, the detail view or the combination of the summary and detail views is selected from a group consisting of bar charts, heatmap timeline plots, pie charts, listings and profiles.

11. The system of claim 7, wherein the visualization of the hierarchical structure is based on the selected analytic.

12. The system of claim 1, further comprising a treemap filter configured to allow a user to select the user selected analytic.

13. The system of claim 12, wherein the treemap filter comprises one or more dropdown boxes, sliders, or other controllers that allows a user to select from a predefined list of analytics.

14. An interactive navigation environment system comprising:
   a processor;
   a display connected to the processor;
   heating, ventilation and air conditioning (HVAC) equipment having sensors connected to the processor; and
   a visualization tool for energy consumption monitoring provided by the processor via the display; and
   wherein the visualization tool provides an interactive navigation environment having a treemap filter and a treemap.

15. The system of claim 14, wherein the visualization tool is configured to present summary analytic results, guide a user through a detailed analysis, allow for dynamic filtering of results, and/or allow for selection of a specific HVAC equipment component or building zone.

16. A method for navigating an interactive environment for a visualization of heating, ventilation and air conditioning (HVAC) performance within a building, comprising:
   selecting an analytic from a treemap filter to display a hierarchal structure of at least a portion of one or more components forming an HVAC system within a building;
   displaying a treemap of the hierarchal structure of the one or more components; and
   selecting one or more components for a detailed analysis to display a detailed or summary view of the selected components in a graph pane of a display.

17. The method of claim 16, further comprising selecting a date and/or time interval for detailed analysis.

18. The method of claim 16, wherein the treemap is configured to be displayed in a first area of a display and the detailed or summary view if configured to be displayed in a second area of a display.

19. The method of claim 16, wherein the one or more components displayed are filtered according to a fault relevancy.

20. The method of claim 19, wherein the fault relevancy of a component is determined by a number of faults that occur relative to the component over a predetermined length of time.

* * * * *